United States Patent
Okada et al.

(10) Patent No.: US 12,523,527 B2
(45) Date of Patent: Jan. 13, 2026

(54) LENS DEVICE, FILTER UNIT, AND IMAGING APPARATUS

(71) Applicant: FUJIFILM Corporation, Tokyo (JP)

(72) Inventors: Kazuyoshi Okada, Saitama (JP); Yasunobu Kishine, Saitama (JP); Atsushi Kawanago, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

(21) Appl. No.: 18/341,753

(22) Filed: Jun. 26, 2023

(65) Prior Publication Data

US 2023/0341262 A1 Oct. 26, 2023

Related U.S. Application Data

(63) Continuation of application No. PCT/JP2021/047237, filed on Dec. 21, 2021.

(30) Foreign Application Priority Data

Jan. 19, 2021 (JP) .................................. 2021-006331

(51) Int. Cl.
*H04N 23/55* (2023.01)
*G01J 3/02* (2006.01)
*G01J 3/28* (2006.01)

(52) U.S. Cl.
CPC ........... *G01J 3/0208* (2013.01); *G01J 3/0224* (2013.01); *G01J 3/0229* (2013.01); *G01J 3/2823* (2013.01);
(Continued)

(58) Field of Classification Search
CPC .................. G01J 3/0224; G01J 3/0208; G01J 2003/2826; H04N 23/55
See application file for complete search history.

(56) References Cited

U.S. PATENT DOCUMENTS

| | | |
|---|---|---|
| 10,051,159 B2 | 8/2018 | Matsuzaki et al. |
| 2021/0274065 A1 | 9/2021 | Ono |

(Continued)

FOREIGN PATENT DOCUMENTS

| | | | |
|---|---|---|---|
| CN | 115039008 A | * 9/2022 | ............. H04N 23/71 |
| JP | 2012247645 | 12/2012 | |

(Continued)

OTHER PUBLICATIONS

"International Search Report (Form PCT/ISA/210) of PCT/JP2021/047237", mailed on Feb. 15, 2022, with English translation thereof, pp. 1-5.

(Continued)

*Primary Examiner* — Maurice C Smith
(74) *Attorney, Agent, or Firm* — JCIPRNET

(57) ABSTRACT

Provided are a lens device, a filter unit, and an imaging apparatus capable of suppressing occurrence of ghosts. The lens device includes a filter unit in an optical path. The filter unit has a plurality of opening portions including a first opening portion and a second opening portion. At least the first opening portion and the second opening portion each include a band-pass filter, and each include an optical element on at least one of an object side or an image side of the band-pass filter. The optical element is composed of a polarized light filter and a wave plate which converts linearly polarized light into circularly polarized light or elliptically polarized light. The first opening portion and the second opening portion pass light in different wavelength regions and different polarization directions.

16 Claims, 24 Drawing Sheets

(52) U.S. Cl.
CPC ...... *H04N 23/55* (2023.01); *G01J 2003/2826* (2013.01)

(56) References Cited

U.S. PATENT DOCUMENTS

2022/0181528 A1\* 6/2022 Chen .................. H10K 59/8791
2022/0268632 A1\* 8/2022 Liang ........................ G01J 3/51

FOREIGN PATENT DOCUMENTS

| JP | 2016036127 | 3/2016 |
|----|------------|--------|
| WO | 2020110595 | 6/2020 |

OTHER PUBLICATIONS

"Written Opinion of the International Searching Authority (Form PCT/ISA/237) of PCT/JP2021/047237", mailed on Feb. 15, 2022, with English translation thereof, pp. 1-7.
"Office Action of Japan Counterpart Application", issued on Sep. 3, 2025, with English translation thereof, p. 1-p. 6.

\* cited by examiner

FIG. 6

| | BPF | OPTICAL ISOLATOR | |
|---|---|---|---|
| | | QWP | PLF |
| FIRST WINDOW PORTION | $\lambda 1$ | 45° | 0° |
| SECOND WINDOW PORTION | $\lambda 2$ | 105° | 60° |
| THIRD WINDOW PORTION | $\lambda 3$ | 165° | 120° |

OBJECT SIDE ←→ IMAGE SIDE

FIG. 11

| | BPF | OPTICAL ISOLATOR ||
| | | QWP | PLF |
|---|---|---|---|
| FIRST WINDOW PORTION | $\lambda 1$ | 135° | 0° |
| SECOND WINDOW PORTION | $\lambda 2$ | 15° | 60° |
| THIRD WINDOW PORTION | $\lambda 3$ | 75° | 120° |

OBJECT SIDE ↔ IMAGE SIDE

FIG. 13

OBJECT SIDE ←————————————————————→ IMAGE SIDE

|  | FIRST OPTICAL ISOLATOR ||  BPF  | SECOND OPTICAL ISOLATOR ||
|  | FIRST PLF | FIRST QWP |  | SECOND QWP | SECOND PLF |
| --- | --- | --- | --- | --- | --- |
| FIRST WINDOW PORTION | 0° | 135° | $\lambda 1$ | 45° | 0° |
| SECOND WINDOW PORTION | 60° | 15° | $\lambda 2$ | 105° | 60° |
| THIRD WINDOW PORTION | 120° | 75° | $\lambda 3$ | 165° | 120° |

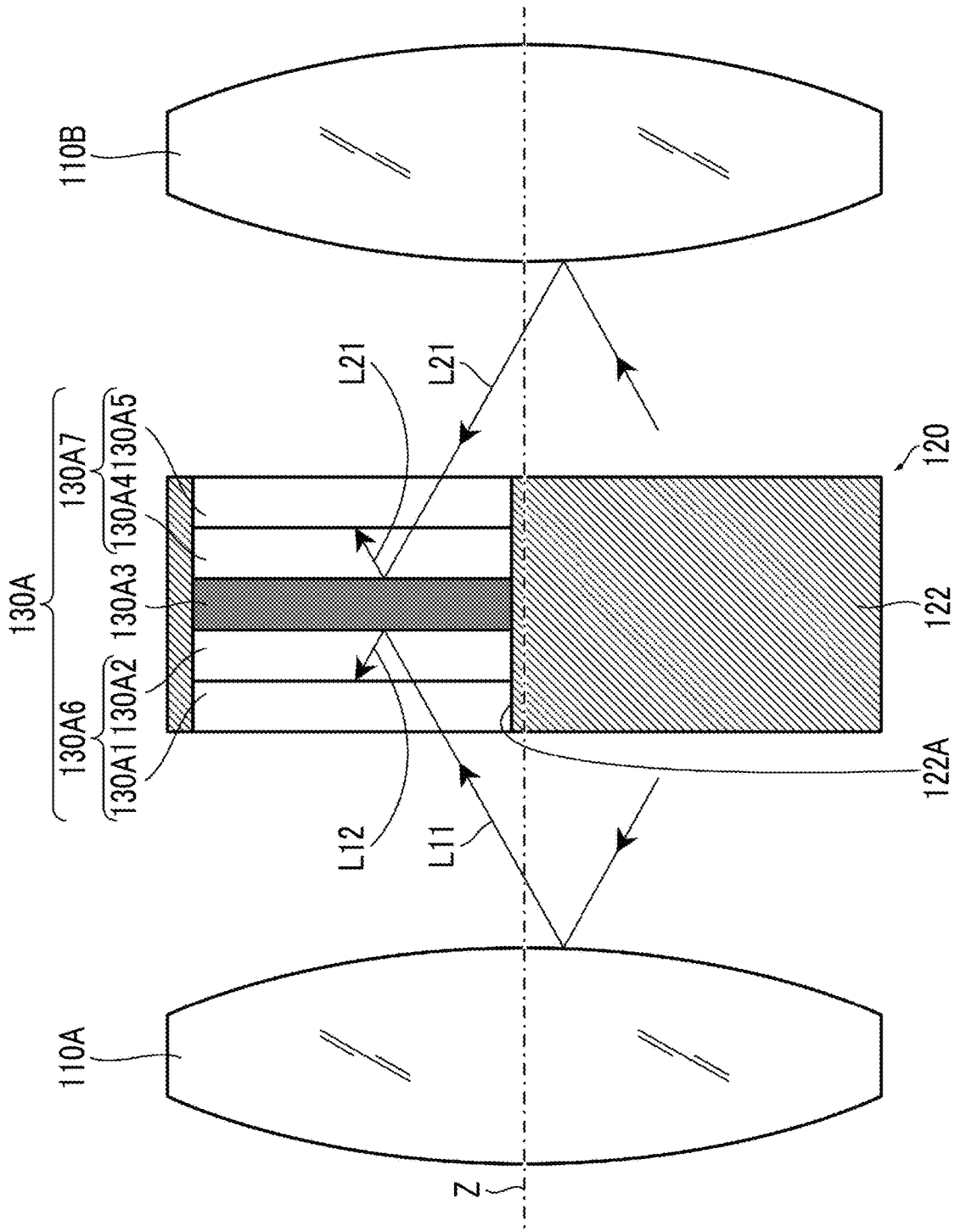

FIG. 15A

OBJECT SIDE ←——————————————→ IMAGE SIDE

| | FIRST OPTICAL ISOLATOR | | BPF | SECOND OPTICAL ISOLATOR | |
|---|---|---|---|---|---|
| | FIRST PLF | FIRST QWP | | SECOND QWP | SECOND PLF |
| FIRST WINDOW PORTION | 0° | 45° | $\lambda 1$ | 135° | 0° |
| SECOND WINDOW PORTION | 60° | 105° | $\lambda 2$ | 15° | 60° |
| THIRD WINDOW PORTION | 120° | 165° | $\lambda 3$ | 75° | 120° |

FIG. 15B

OBJECT SIDE ←——————————————→ IMAGE SIDE

| | FIRST OPTICAL ISOLATOR | | BPF | SECOND OPTICAL ISOLATOR | |
|---|---|---|---|---|---|
| | FIRST PLF | FIRST QWP | | SECOND QWP | SECOND PLF |
| FIRST WINDOW PORTION | 0° | 135° | $\lambda 1$ | 45° | 0° |
| SECOND WINDOW PORTION | 0° | 135° | $\lambda 2$ | 105° | 60° |
| THIRD WINDOW PORTION | 0° | 135° | $\lambda 3$ | 165° | 120° |

FIG. 15C

OBJECT SIDE ←——————————————→ IMAGE SIDE

| | FIRST OPTICAL ISOLATOR | | BPF | SECOND OPTICAL ISOLATOR | |
|---|---|---|---|---|---|
| | FIRST PLF | FIRST QWP | | SECOND QWP | SECOND PLF |
| FIRST WINDOW PORTION | 0° | 45° | $\lambda 1$ | 135° | 0° |
| SECOND WINDOW PORTION | 0° | 45° | $\lambda 2$ | 15° | 60° |
| THIRD WINDOW PORTION | 0° | 45° | $\lambda 3$ | 75° | 120° |

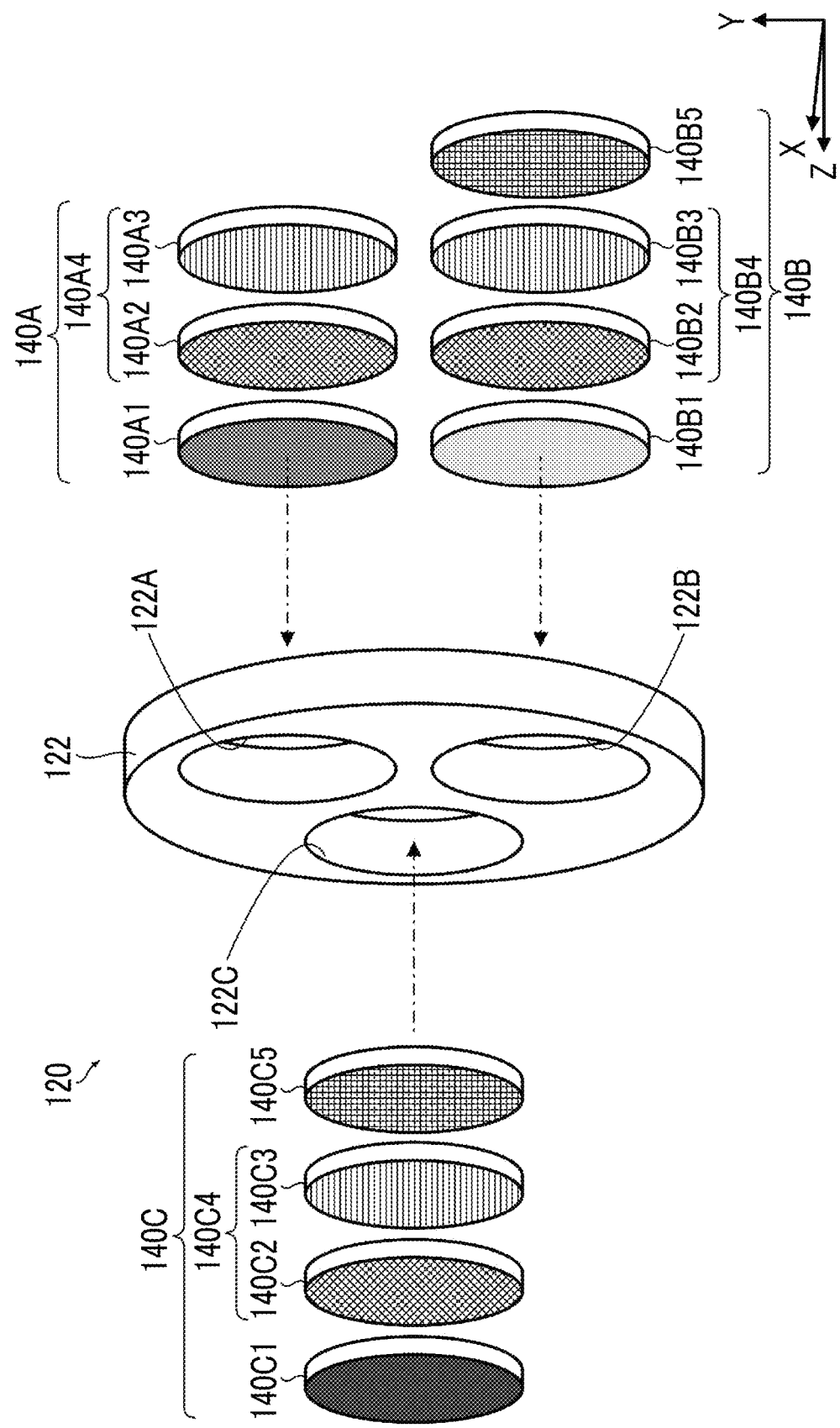

FIG. 17

| | BPF | OPTICAL ISOLATOR | | HWP |
| --- | --- | --- | --- | --- |
| | | QWP | PLF | |
| FIRST WINDOW PORTION | $\lambda 1$ | 45° | 0° | – |
| SECOND WINDOW PORTION | $\lambda 2$ | 45° | 0° | 30° |
| THIRD WINDOW PORTION | $\lambda 3$ | 45° | 0° | 150° |

OBJECT SIDE ←——→ IMAGE SIDE

FIG. 18

| | BPF | OPTICAL ISOLATOR | | HWP |
| --- | --- | --- | --- | --- |
| | | QWP | PLF | |
| FIRST WINDOW PORTION | $\lambda 1$ | 135° | 0° | – |
| SECOND WINDOW PORTION | $\lambda 2$ | 135° | 0° | 30° |
| THIRD WINDOW PORTION | $\lambda 3$ | 135° | 0° | 150° |

OBJECT SIDE ←——→ IMAGE SIDE

FIG. 19A

| | FIRST OPTICAL ISOLATOR | | BPF | SECOND OPTICAL ISOLATOR | | HWP |
| --- | --- | --- | --- | --- | --- | --- |
| | FIRST PLF | FIRST QWP | | SECOND QWP | SECOND PLF | |
| FIRST WINDOW PORTION | 0° | 135° | $\lambda 1$ | 45° | 0° | - |
| SECOND WINDOW PORTION | 0° | 135° | $\lambda 2$ | 45° | 0° | 30° |
| THIRD WINDOW PORTION | 0° | 135° | $\lambda 3$ | 45° | 0° | 150° |

OBJECT SIDE ←→ IMAGE SIDE

FIG. 19B

| | FIRST OPTICAL ISOLATOR | | BPF | SECOND OPTICAL ISOLATOR | | HWP |
| --- | --- | --- | --- | --- | --- | --- |
| | FIRST PLF | FIRST QWP | | SECOND QWP | SECOND PLF | |
| FIRST WINDOW PORTION | 0° | 45° | $\lambda 1$ | 135° | 0° | - |
| SECOND WINDOW PORTION | 0° | 45° | $\lambda 2$ | 135° | 0° | 30° |
| THIRD WINDOW PORTION | 0° | 45° | $\lambda 3$ | 135° | 0° | 150° |

OBJECT SIDE ←→ IMAGE SIDE

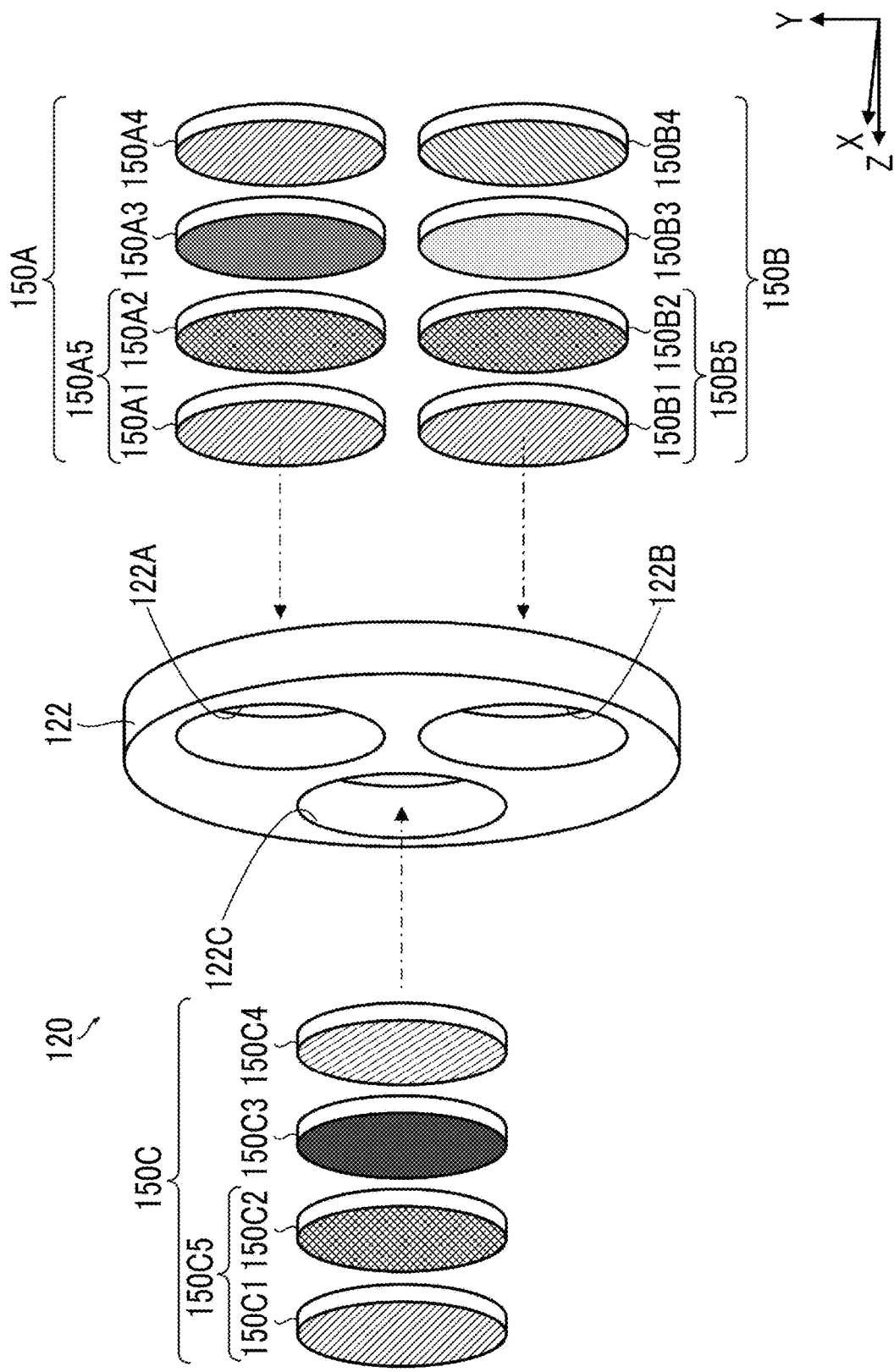

FIG. 21

| | OPTICAL ISOLATOR | | BPF | SECOND PLF |
|---|---|---|---|---|
| | FIRST PLF | QWP | | |
| FIRST WINDOW PORTION | 0° | 45° | $\lambda 1$ | 0° |
| SECOND WINDOW PORTION | 0° | 45° | $\lambda 2$ | 60° |
| THIRD WINDOW PORTION | 0° | 45° | $\lambda 3$ | 120° |

OBJECT SIDE ←→ IMAGE SIDE

FIG. 22A

| | OPTICAL ISOLATOR | | BPF | SECOND PLF |
|---|---|---|---|---|
| | FIRST PLF | QWP | | |
| FIRST WINDOW PORTION | 0° | 135° | λ1 | 0° |
| SECOND WINDOW PORTION | 0° | 135° | λ2 | 60° |
| THIRD WINDOW PORTION | 0° | 135° | λ3 | 120° |

OBJECT SIDE ←→ IMAGE SIDE

FIG. 22B

| | OPTICAL ISOLATOR | | BPF | SECOND PLF |
|---|---|---|---|---|
| | FIRST PLF | QWP | | |
| FIRST WINDOW PORTION | 0° | 45° | λ1 | 0° |
| SECOND WINDOW PORTION | 60° | 15° | λ2 | 60° |
| THIRD WINDOW PORTION | 120° | 75° | λ3 | 120° |

OBJECT SIDE ←→ IMAGE SIDE

FIG. 22C

| | OPTICAL ISOLATOR | | BPF | SECOND PLF |
|---|---|---|---|---|
| | FIRST PLF | QWP | | |
| FIRST WINDOW PORTION | 0° | 135° | λ1 | 0° |
| SECOND WINDOW PORTION | 60° | 105° | λ2 | 60° |
| THIRD WINDOW PORTION | 120° | 165° | λ3 | 120° |

OBJECT SIDE ←→ IMAGE SIDE

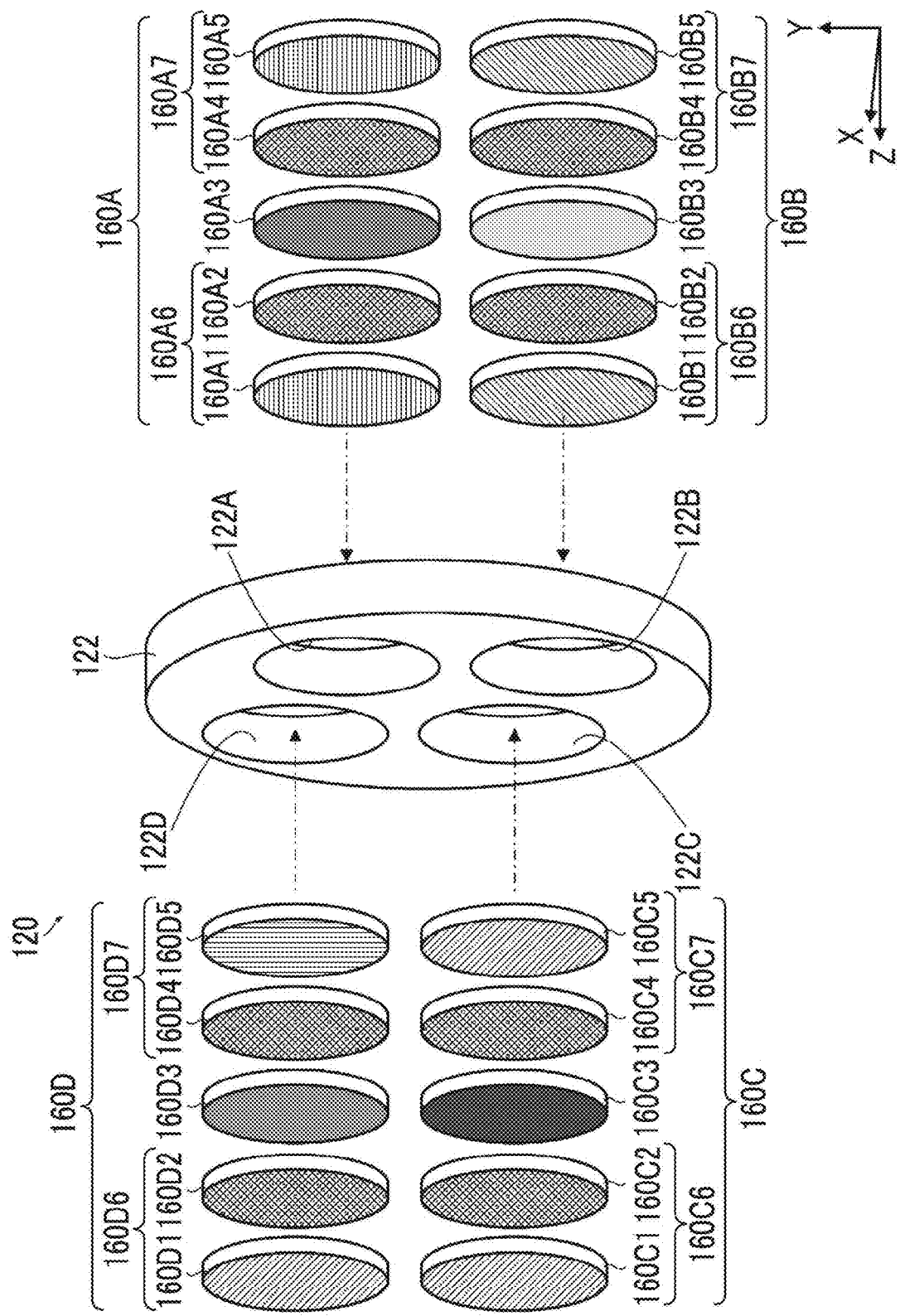

FIG. 24

| | FIRST OPTICAL ISOLATOR | | BPF | SECOND OPTICAL ISOLATOR | |
|---|---|---|---|---|---|
| | FIRST PLF | FIRST QWP | | SECOND QWP | SECOND PLF |
| FIRST WINDOW PORTION | 0° | 45° | $\lambda 1$ | 135° | 0° |
| SECOND WINDOW PORTION | 0° | 45° | $\lambda 2$ | 15° | 60° |
| THIRD WINDOW PORTION | 0° | 45° | $\lambda 3$ | 75° | 120° |
| FOURTH WINDOW PORTION | 0° | 45° | $\lambda 4$ | 45° | 90° |

OBJECT SIDE ←————————————→ IMAGE SIDE

LENS DEVICE, FILTER UNIT, AND IMAGING APPARATUS

CROSS-REFERENCE TO RELATED APPLICATIONS

The present application is a Continuation of PCT International Application No. PCT/JP2021/047237 filed on Dec. 21, 2021 claiming priority under 35 U.S.C § 119(a) to Japanese Patent Application No. 2021-006331 filed on Jan. 19, 2021. Each of the above applications is hereby expressly incorporated by reference, in its entirety, into the present application.

BACKGROUND OF THE INVENTION

1. Field of the Invention

The present invention relates to a lens device, a filter unit, and an imaging apparatus, and more particularly to a lens device, a filter unit, and an imaging apparatus capable of capturing an image dispersed in a plurality of wavelengths.

2. Description of the Related Art

JP2016-36127A describes an imaging apparatus that captures an image dispersed in the plurality of wavelengths. JP2016-36127A describes, as a first embodiment, an imaging apparatus in which a light absorption filter that absorbs light reflected by an imaging surface of an image sensor is disposed between a lens optical system and the image sensor. Further, JP2016-36127A describes, as a second embodiment, an imaging apparatus in which a polarizer and a quarter-wave plate are disposed in cell of the light absorption filter.

SUMMARY OF THE INVENTION

One embodiment according to a technique of the present disclosure provides a lens device, a filter unit, and an imaging apparatus capable of suppressing occurrence of ghosts.

(1) A lens device according to an aspect of the present invention comprises a filter unit in an optical path, in which the filter unit has a plurality of opening portions including a first opening portion and a second opening portion, at least the first opening portion and the second opening portion each include a band-pass filter, and each include an optical element on at least one of an object side or an image side of the band-pass filter, the optical element is composed of a polarized light filter and a wave plate which converts linearly polarized light into circularly polarized light or elliptically polarized light, and the first opening portion and the second opening portion pass light in different wavelength regions and different polarization directions.

(2) The lens device according to (1), in which the wave plate is a quarter-wave plate.

(3) The lens device according to (1) or (2), in which the filter unit is disposed at a pupil position or near the pupil position.

(4) The lens device according to any one of (1) to (3), in which in a case where the optical element is disposed on the image side of the band-pass filter or on the object side and the image side of the band-pass filter, at least one of the first opening portion and the second opening portion further includes a half-wave plate on an image side of the optical element disposed on the image side of the band-pass filter.

(5) The lens device according to (4), in which an angle of a transmission axis of the polarized light filter of the optical element disposed on the image side of the band-pass filter is equal between the first opening portion and the second opening portion.

(6) The lens device according to any one of (1) to (5), in which in a case where the optical element is disposed on the object side and the image side of the band-pass filter, angles of fast axes of the wave plate are different between the object side and the image side of the band-pass filter.

(7) The lens device according to (6), in which the fast axes of the wave plate are orthogonal to each other on the object side and the image side of the band-pass filter.

(8) The lens device according to any one of (1) to (3), in which in a case where the optical element is disposed on the object side of the band-pass filter, the first opening portion and the second opening portion each further include a polarized light filter on the image side of the band-pass filter.

(9) The lens device according to any one of (1) to (8), in which the polarized light filter is an absorption type.

(10) A filter unit according to an aspect of the present invention is disposed in an optical path of a lens device. The filter unit comprises: a plurality of opening portions including a first opening portion and a second opening portion, at least the first opening portion and the second opening portion each include a band-pass filter, and each include an optical element on at least one of an object side or an image side of the band-pass filter, the optical element is composed of a polarized light filter and a wave plate which converts linearly polarized light into circularly polarized light or elliptically polarized light, and the first opening portion and the second opening portion pass light in different wavelength regions and different polarization directions.

(11) The filter unit according to (10), in which the wave plate is a quarter-wave plate.

(12) An imaging apparatus according to an aspect of the present invention comprises: the lens device according to any one of (1) to (9); and a polarization image sensor that receives light which passes through the lens device.

BRIEF DESCRIPTION OF THE DRAWINGS

FIG. 6 is a diagram showing an example of a configuration of filter groups provided in the respective window portions.

FIG. 11 is a diagram showing a modification example of the filter groups provided in the respective window portions.

FIG. 13 is a diagram showing an example of a configuration of the filter groups provided in the respective window portions.

FIG. 14 is a diagram showing a function of preventing re-reflection by front and rear optical isolators.

FIGS. 15A to 15C are diagrams showing modification examples of the filter groups provided in the respective window portions.

FIG. 16 is a diagram showing a schematic configuration of the filter unit.

FIG. 17 is a diagram showing an example of a configuration of the filter groups provided in the respective window portions.

FIG. 18 is a diagram showing a modification example of the filter groups provided in the respective window portions.

FIGS. 19A and 19B are diagrams each showing an example of a configuration of the filter groups provided in the respective window portions in a case where the optical isolators are disposed before and after a band-pass filter.

FIG. 20 is a diagram showing a schematic configuration of the filter unit.

FIG. 21 is a diagram showing an example of a configuration of the filter groups provided in the respective window portions.

FIGS. 22A to 22C are diagrams each showing a modification example of the filter groups provided in the respective window portions.

FIG. 23 is a diagram showing an example of a configuration of the filter unit in a case where imaging is performed by splitting the spectrum into four wavelengths.

FIG. 24 is a diagram showing an example of a configuration of the filter groups provided in the respective window portions.

DESCRIPTION OF THE PREFERRED EMBODIMENTS

Hereinafter, preferred embodiments of the present invention will be described in detail with reference to the accompanying drawings.

First Embodiment

Here, a case where the present invention is applied to a multispectral camera system will be described as an example. The multispectral camera system is a system which simultaneously captures images dispersed in a plurality of wavelengths. Here, a case where images dispersed in three wavelengths are simultaneously captured will be described as an example.

[Configuration of Multispectral Camera System]

Figure 1:
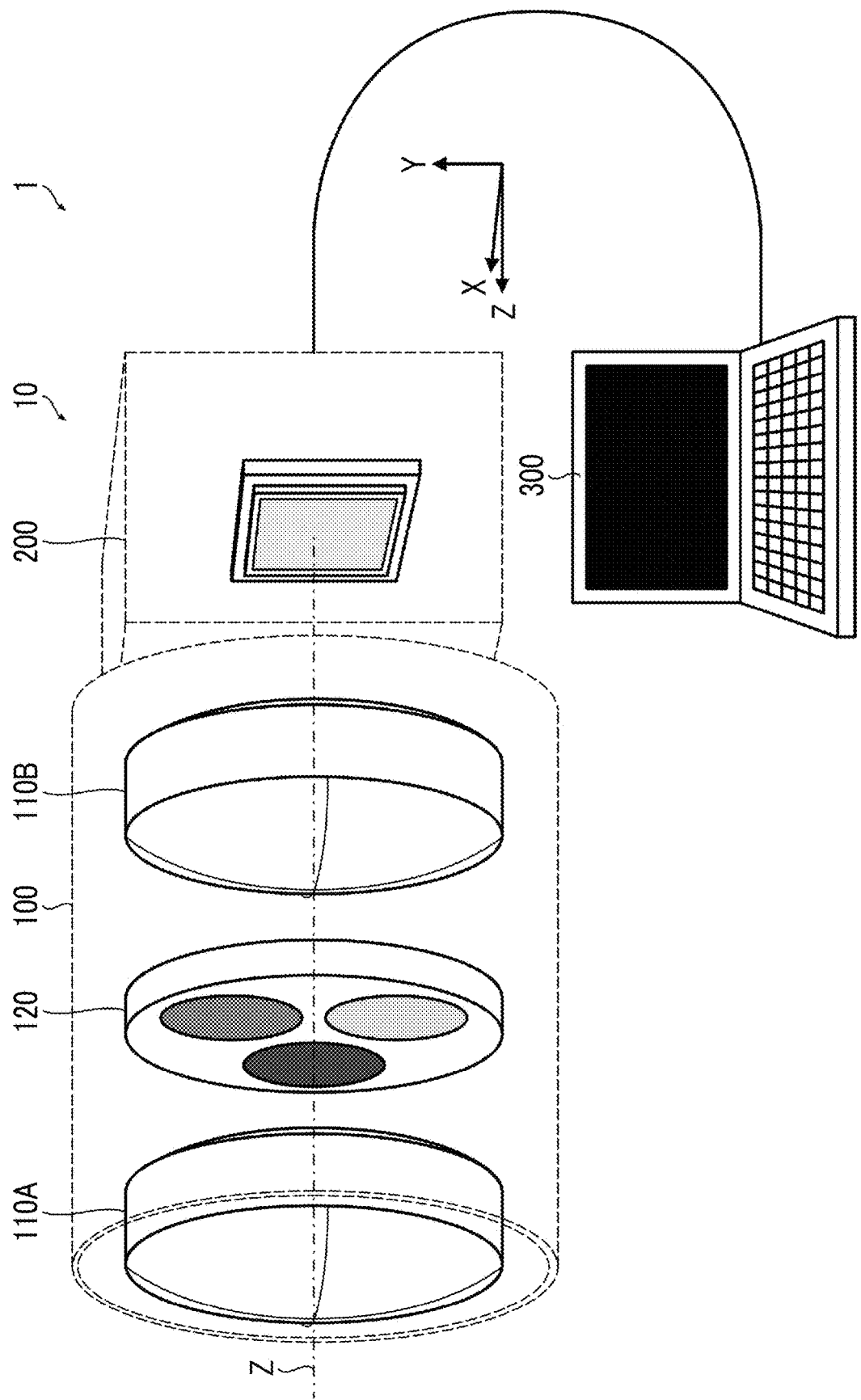
FIG. 1 is a diagram showing a schematic configuration of a multispectral camera system.

FIG. 1 is a diagram showing a schematic configuration of the multispectral camera system.

The multispectral camera system shown in the drawing is a so-called polarization type multispectral camera system. The polarization type is a multispectral camera system of a method using polarization. As shown in the drawing, the multispectral camera system 1 mostly is composed of a multispectral camera 10 and a signal processing device 300. The multispectral camera 10 is composed of a lens device 100 and a camera body 200. The multispectral camera 10 is an example of the imaging apparatus.

[Lens Device]

As shown in FIG. 1, the lens device 100 comprises a plurality of lens groups 110A and 110B, and a filter unit 120.

The lens groups 110A and 110B each are composed of at least one lens. FIG. 1 shows, for convenience, only two lens groups 110A and 110B. Hereinafter, the two lens groups 110A and 110B are distinguished, as necessary. The lens group 110A disposed on the front side of the filter unit 120 is set as a first lens group. The lens group 110B disposed on the rear side of the filter unit 120 is set as a second lens group. It should be noted that the "front side" means the "object side", and the "rear side" means the "image side".

The filter unit 120 is disposed in the optical path. More specifically, the filter unit 120 is disposed at a pupil position or near the pupil position in the lens device 100. It should be noted that the vicinity of the pupil position means a region satisfying the following expression.

$$|d| < \varphi/(2 \tan \theta)$$

Here, $\theta$ is a maximum principal ray angle at the pupil position (the principal ray angle is an angle between the principal ray and the optical axis), $\varphi$ is a pupil diameter, and $|d|$ is a distance from the pupil position.

Figure 2:
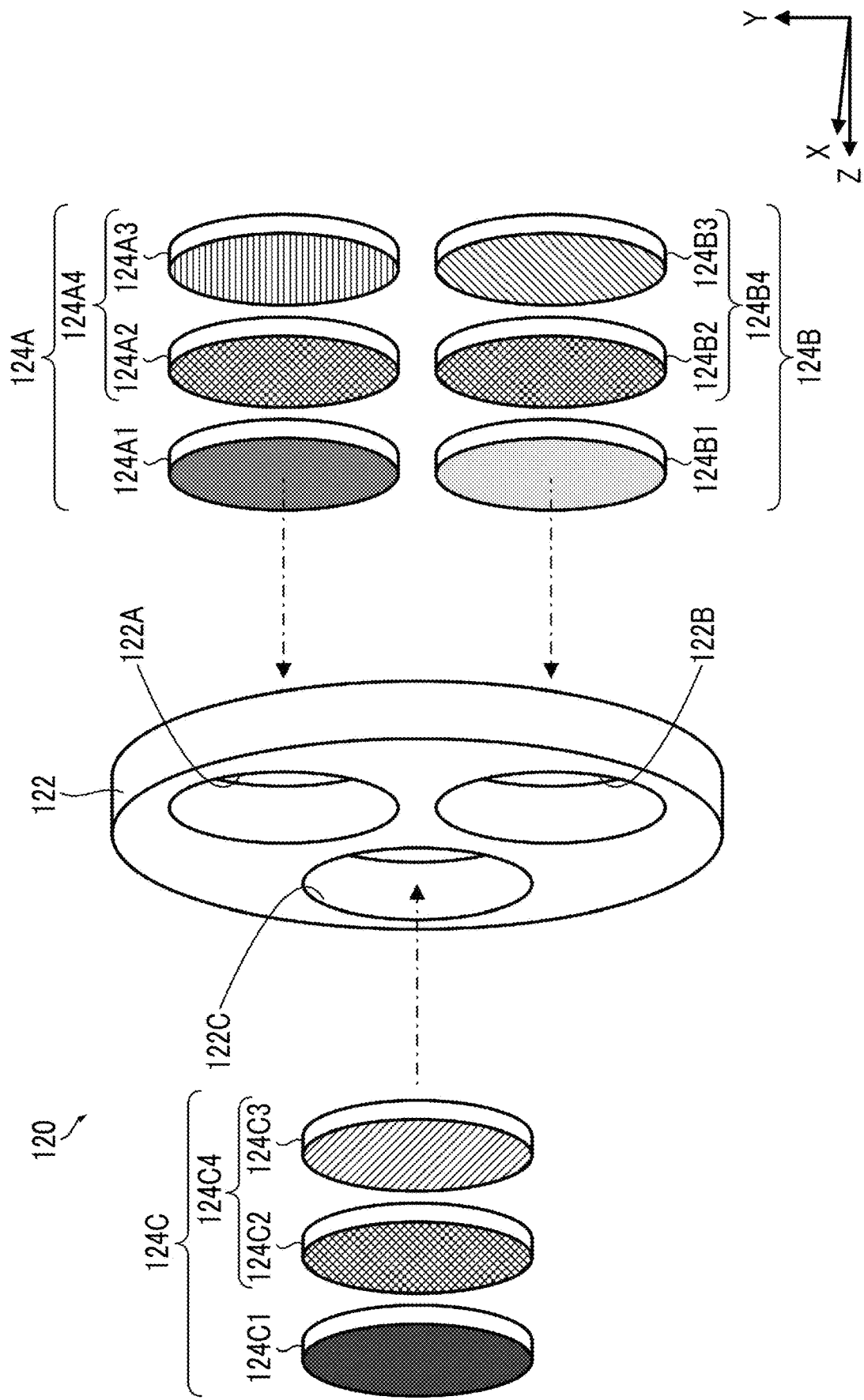
FIG. 2 is a diagram showing a schematic configuration of a filter unit.

FIG. 2 is a diagram showing a schematic configuration of the filter unit.

The filter unit 120 is composed of a filter frame 122 and three filter groups 124A, 124B, and 124C which are mounted on the filter frame 122.

The filter frame 122 has a plate-like shape corresponding to an inner peripheral shape of the lens barrel, and has a plurality of window portions. As shown in FIG. 2, the filter frame 122 according to the present embodiment has a disk shape and has three window portions 122A, 122B, and 122C.

The three window portions 122A, 122B, and 122C are configured as circular opening portions and are disposed at equal intervals along the circumferential direction. The window portions 122A, 122B, and 122C are examples of the opening portions. Hereinafter, as necessary, the window portions 122A, 122B, and 122C will be distinguished, such that the window portion 122A is set as the first window portion, the window portion 122B is set as the second window portion, and the window portion 122C is set as the third window portion. The first window portion 122A is an example of the first opening portion. The second window portion 122B is an example of the second opening portion.

The filter groups 124A, 124B, and 124C are individually mounted on the three window portions 122A, 122B, and 122C, respectively.

The three filter groups 124A, 124B, and 124C each are composed of three filters. The three filters are composed of band-pass filters (BPF) 124A1, 124B1, 124C1, quarter-wave plates (QWP) 124A2, 124B2, 124C2, and polarized light filters (PLF) 124A3, 124B3, and 124C3. The three filters are disposed in order of the band-pass filters 124A1, 124B1, and 124C1, the quarter-wave plates 124A2, 124B2, and 124C2, and the polarized light filters 124A3, 124B3, and 124C3 from the object side along the optical axis Z.

The band-pass filters 124A1, 124B1, and 124C1 with different transmission wavelength regions are provided respectively in the three window portions 122A, 122B, and 122C. The band-pass filter 124A1 provided in the first window portion 122A transmits light with the first wavelength region λ1. The band-pass filter 124B1 provided in the second window portion 122B transmits light with the second wavelength region λ2 (λ2≠λ1). The band-pass filter 124C1 provided in the third window portion 122C transmits light with a third wavelength region λ3 (λ3≠λ1, λ3≠λ2).

From the viewpoint of a high degree of freedom in the spectral transmission characteristics, it is preferable to use reflective type band-pass filters 124A1, 124B1, and 124C1.

The three window portions 122A, 122B, and 122C are provided with polarized light filters 124A3, 124B3, and 124C3, which have different angles of transmission axes. The transmission axis of the polarized light filter 124A3 provided in the first window portion 122A is set as the first angle θA. The transmission axis of the polarized light filter 124B3 provided in the second window portion 122B is set as the second angle θB (θB≠θA). The transmission axis of the polarized light filter 124C3 provided in the third window portion 122C is set as the third angle θC (θC≠θA, θC≠θA).

Figure 3:
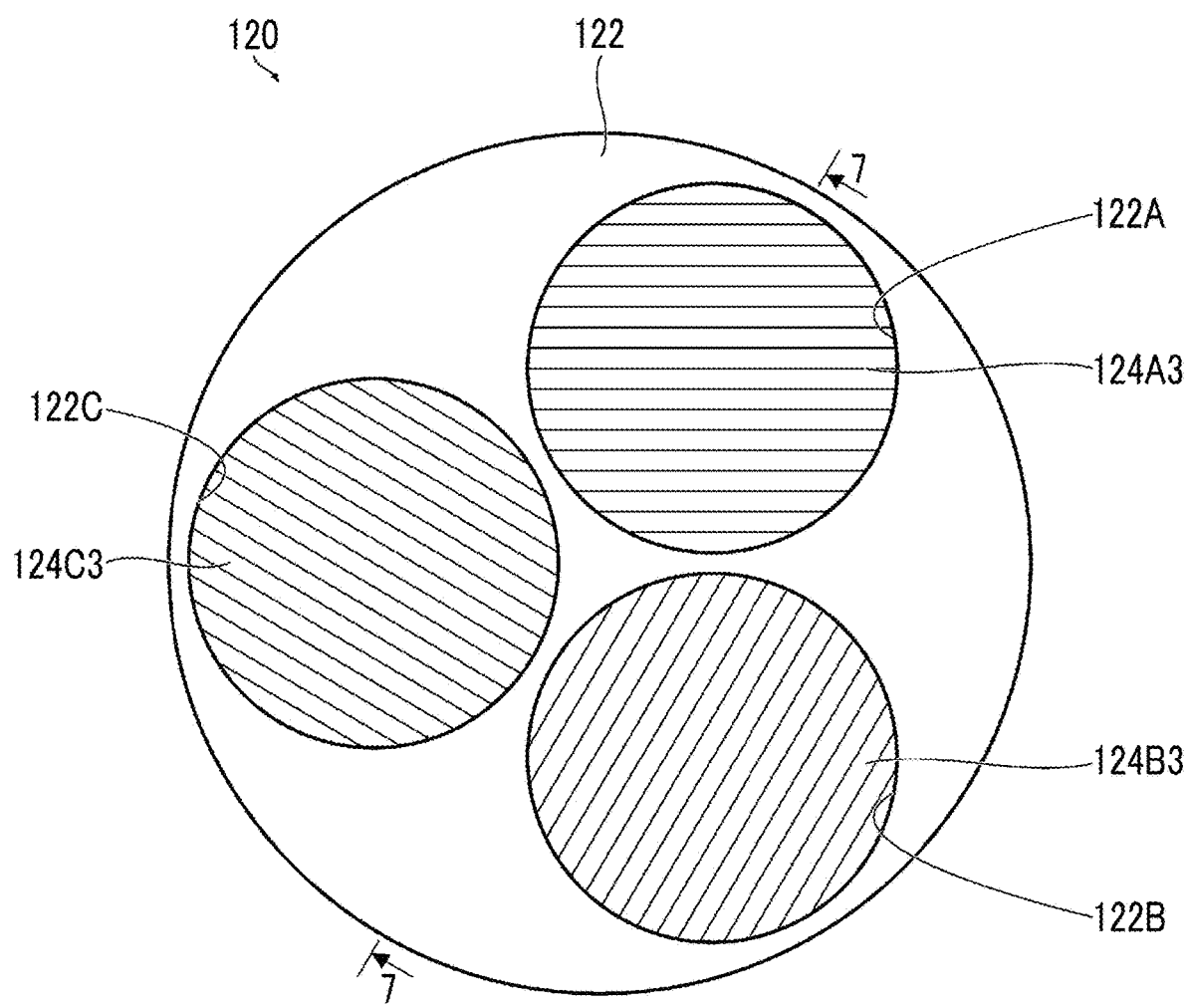
FIG. 3 is a diagram showing an example of a polarized light filter provided in each window portion.

FIG. 3 is a diagram showing an example of the polarized light filter provided in each window portion. FIG. 3 shows the setting of the transmission axis of each of the polarized light filters 124A3, 124B3, and 124C3 in a case where the filter unit 120 is viewed from an object side (front side).

As shown in the drawing, in the filter unit 120 of the present embodiment, the transmission axis of the polarized light filter 124A3 provided in the first window portion 122A is set to θA=0°, and the transmission axis of the polarized light filter 124B3 provided in the second window portion 122B is set to θB=60°, and the transmission axis of the polarized light filter 124C3 provided in the third window portion 122C is set to θC=120°.

It should be noted that the angle is 0° in a state where the transmission axis is parallel to the X-axis, and is set as a plus (+) direction in a counterclockwise direction as viewed from an object side (front side). Consequently, the transmission axis of 60° is a state where the transmission axis is tilted by 60° in a counterclockwise direction with respect to the X-axis. Further, the transmission axis of 120° is a state where the transmission axis is tilted by 120° in a counterclockwise direction with respect to the X-axis.

The X-axis is an axis which is set on a plane orthogonal to the optical axis Z. In the plane orthogonal to the optical axis Z, an axis orthogonal to the X axis is set as a Y axis. As will be described later, in the image sensor provided in the camera body 200, the upper and lower sides of the light-receiving surface thereof are disposed in parallel with the X axis. Further, the left and right sides are disposed in parallel with the Y axis.

Further, as will be described later, it is preferable to use absorption type polarized light filters 124A3, 124B3, and 124C3 from the viewpoint of suppressing ghosts.

The quarter-wave plates 124A2, 124B2, and 124C2 provided in the respective window portions are disposed at an angle of 45° with respect to the polarized light filters 124A3, 124B3, and 124C3 provided in the respective window portions. More specifically, the fast axis (high-speed axis) is tilted by 45° with respect to the transmission axis of the polarized light filters 124A3, 124B3, and 124C3 provided in the respective window portions. In the present embodiment, the fast axis is disposed at the angle of 45° counterclockwise.

Figure 4:
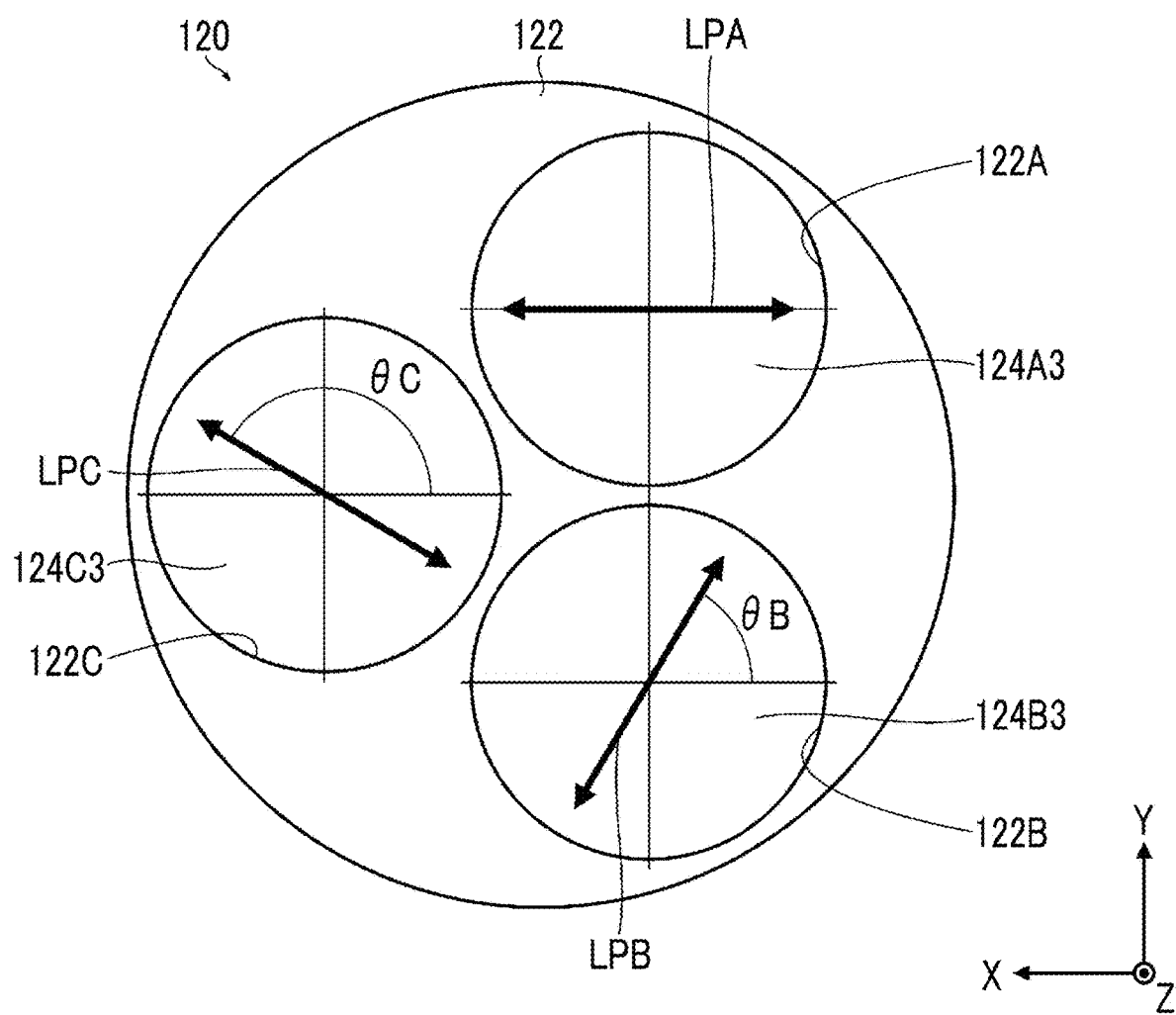
FIG. 4 is a diagram showing an example of the polarized light filter provided in each window portion.
Figure 5:
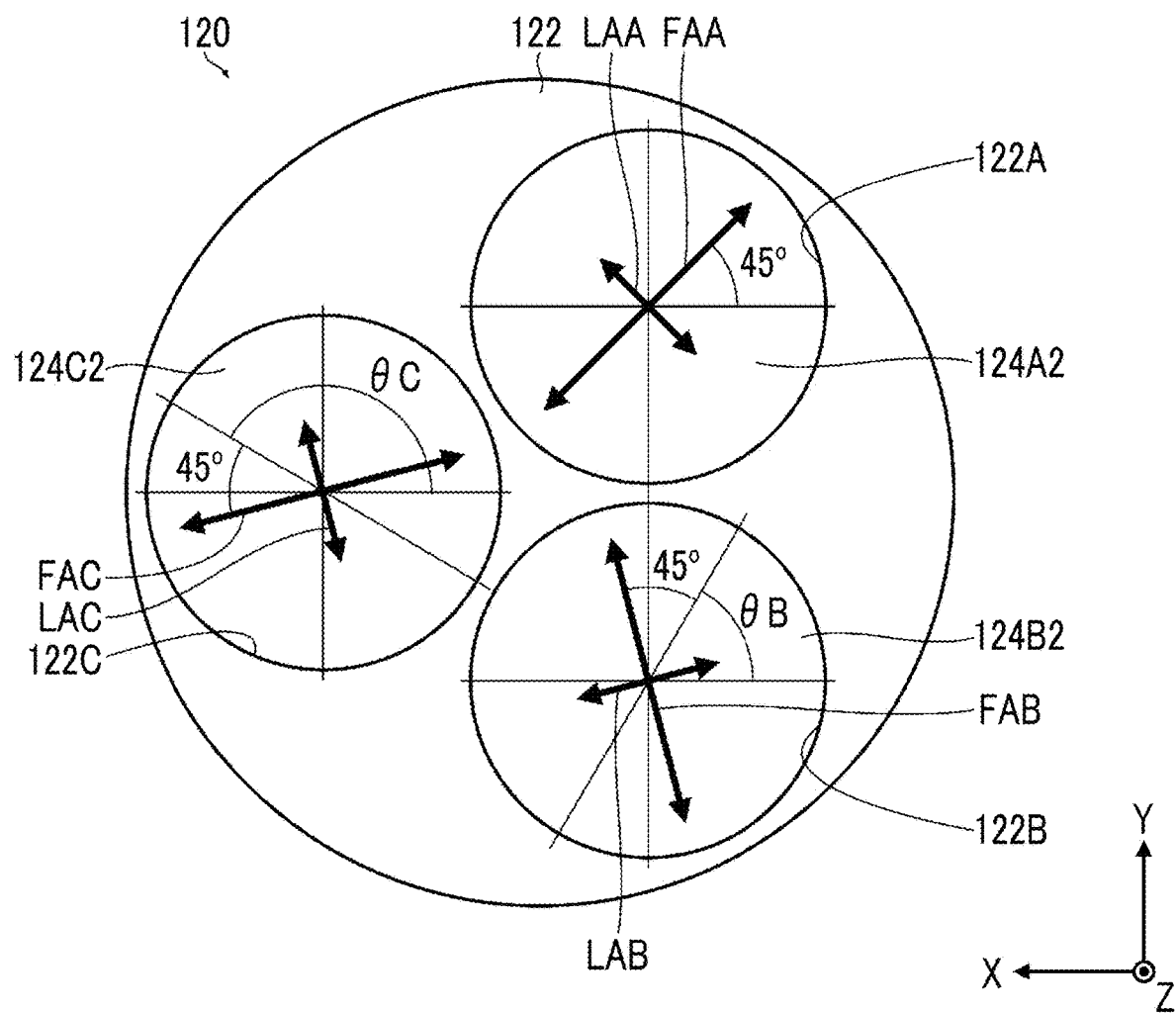
FIG. 5 is a diagram showing an example of a quarter-wave plate provided in each window portion.

FIG. 4 is a diagram showing an example of the polarized light filter provided in each window portion. Further, FIG. 5 is a diagram showing an example of the quarter-wave plate provided in each window portion. Furthermore, FIG. 6 is a diagram showing an example of a configuration of the filter groups provided in the respective window portions.

In FIG. 4, long arrows LPA, LPB, and LPC in the window portions 122A, 122B, and 122C indicate directions of the transmission axes of the polarized light filters 124A3, 124B3, and 124C3 provided in the window portions 122A, 122B, and 122C.

Further, in FIG. 5, arrows FAA, FAB, and FAC in the respective window portions 122A, 122B, and 122C indicate directions of the fast axes of the quarter-wave plates 124A2, 124B2, and 124C2 provided in the window portions 122A, 122B, and 122C.

As shown in FIGS. 4 to 6, the quarter-wave plates 124A2, 124B2, and 124C2 provided in the respective window portions 122A, 122B, and 122C are disposed at the angle of 45° counterclockwise (disposed while being rotated by 45° counterclockwise), with respect to the transmission axes of polarized light filters 124A3, 124B3, and 124C3 provided in the respective window portions. Specifically, the quarter-wave plate of which the angle of the fast axis is 45° is disposed as the quarter-wave plate in the first window portion. Further, the quarter-wave plate of which the angle of the fast axis is 105° is disposed as the quarter-wave plate in the second window portion. Furthermore, the quarter-wave plate of which the angle of the fast axis is 165° is disposed as the quarter-wave plate in the third window portion.

In addition, in FIG. 5, short arrows LAA, LAB, and LAC in the respective window portions 122A, 122B, and 122C indicate directions of the slow axes (low speed axes) of the quarter-wave plates 124A2, 124B2, and 124C2 provided in the respective window portions 122A, 122B, and 122C. The slow axis is orthogonal to the fast axis.

As described above, the window portions 122A, 122B, and 122C are provided with the band-pass filters 124A1, 124B1, and 124C1, the quarter-wave plates 124A2, 124B2, and 124C2, and the polarized light filters 124A3, 124B3, and 124C3, as the filter groups 124A, 124B, and 124C. Among the above-mentioned elements, the quarter-wave plates 124A2, 124B2, and 124C2 and the polarized light filters 124A3, 124B3, and 124C3 are combined to form optical isolators 124A4, 124B4, and 124C4. The quarter-wave plates 124A2, 124B2, and 124C2 and the polarized light filters 124A3, 124B3, and 124C3 constitute the optical isolators 124A4, 124B4, and 124C4, and are thereby set behind the band-pass filters 124A1, 124B1, and 124C1. As a result, it is possible to prevent re-reflection due to return light on the rear surface of the band-pass filters 124A1, 124B1, and 124C1. The optical isolators 124A4, 124B4, and 124C4 are examples of the optical elements. Further, the quarter-wave plates 124A2, 124B2, and 124C2 are examples of wave plates that convert linearly polarized light into circularly polarized light or elliptically polarized light.

Figure 7:
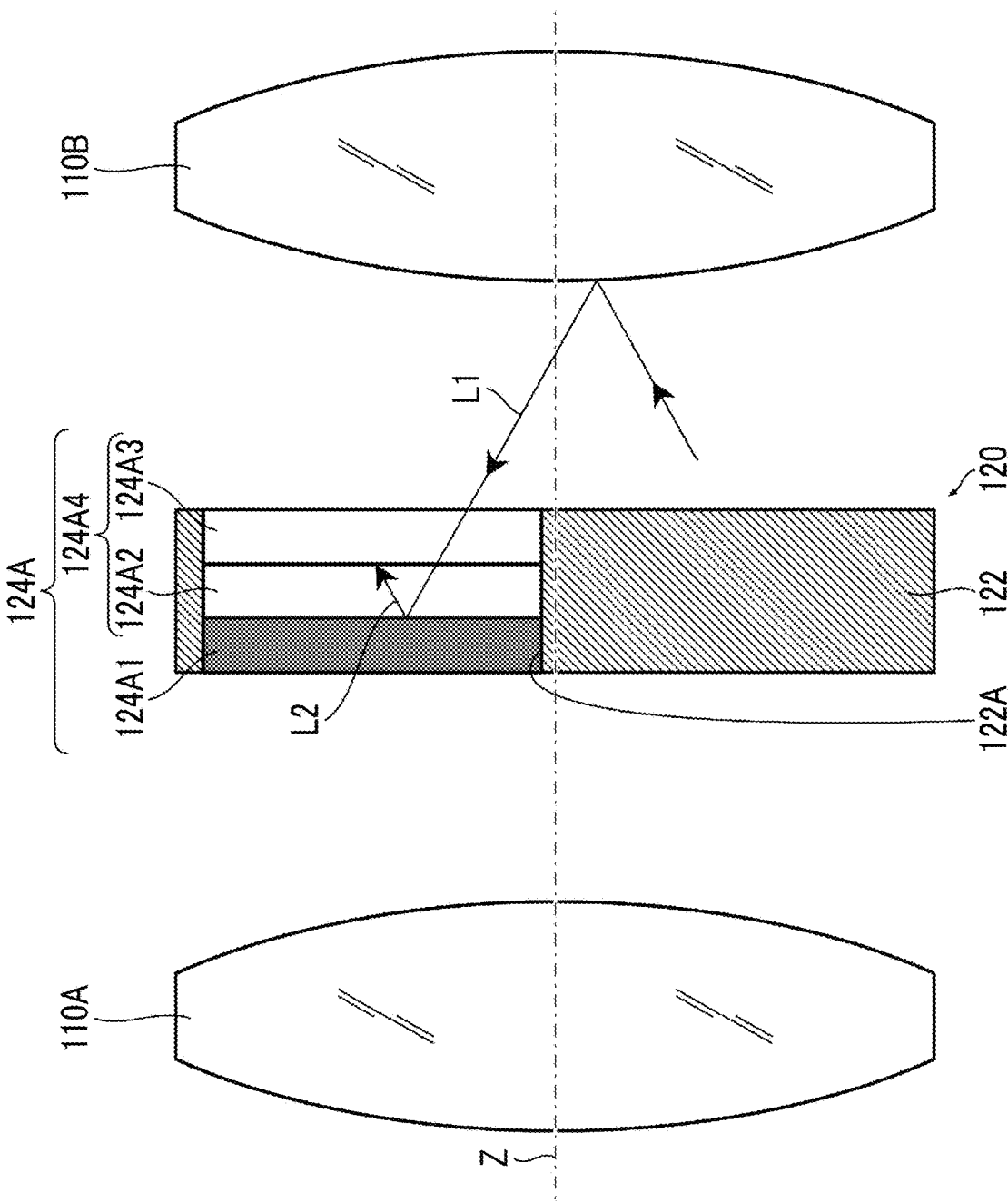
FIG. 7 is a diagram showing a function of preventing re-reflection by an optical isolator.

FIG. 7 is a diagram showing a function of preventing re-reflection by the optical isolator.

FIG. 7 shows an example in a case where the light (return light) reflected by the second lens group 110B is incident on the first window portion 122A. The return light also includes light reflected by, for example, a light-receiving surface of an image sensor. It should be noted that FIG. 7 corresponds to the cross unit 7-7 of FIG. 3.

Return light L1, which is reflected by the second lens group 110B and is incident on the first window portion 122A, is incident on the band-pass filter 124A1 through the optical isolator 124A4. In such a case, the light is transmitted through the optical isolator 124A4 in order of the polarized light filter 124A3 and the quarter-wave plate 124A2, and is incident on the band-pass filter 124A1. In this process, the light is converted into circularly polarized light. In a case where the circularly polarized light is reflected by the band-pass filter 124A1 and is incident on the quarter-wave plate 124A2 again, the light returns to linearly polarized light rotated by 90°. Light L2 of which the direction is changed is blocked from passing through by the polarized light filter 124A3. Thereby, the re-reflection due to the return light is prevented. Then, by preventing the re-reflection of the return light, ghosts can be effectively suppressed.

As described above, the polarized light filters 124A3, 124B3, and 124C3 have a function of blocking passage due to re-reflection by the band-pass filters 124A1, 124B1, and 124C1. Therefore, it is preferable to use an absorption type filter.

[Camera Body]

As shown in FIG. 1, the camera body 200 has an image sensor 210. The image sensor 210 is disposed on the optical axis of the lens device 100 and receives light which passes through the lens device 100. The image sensor 210 is composed of a polarization image sensor. The polarization image sensor is an image sensor equipped with a polarizer, and the polarizer is provided for each pixel. The polarizer is provided, for example, between the microlens and the photodiode. It should be noted that since the type of polarization image sensor is well known (for example, WO2020/071253A, and the like), the details thereof will not be described.

The direction (angle of the transmission axis) of the polarizer mounted on the polarization image sensor is selected in accordance with the number of wavelengths to be imaged. In the present embodiment, images spectrally dispersed by three wavelengths are captured. In such a case, the polarization image sensor including the polarizers in at least three directions is used. In the present embodiment, the polarization image sensor including the polarizers in four directions is used.

Figure 8:
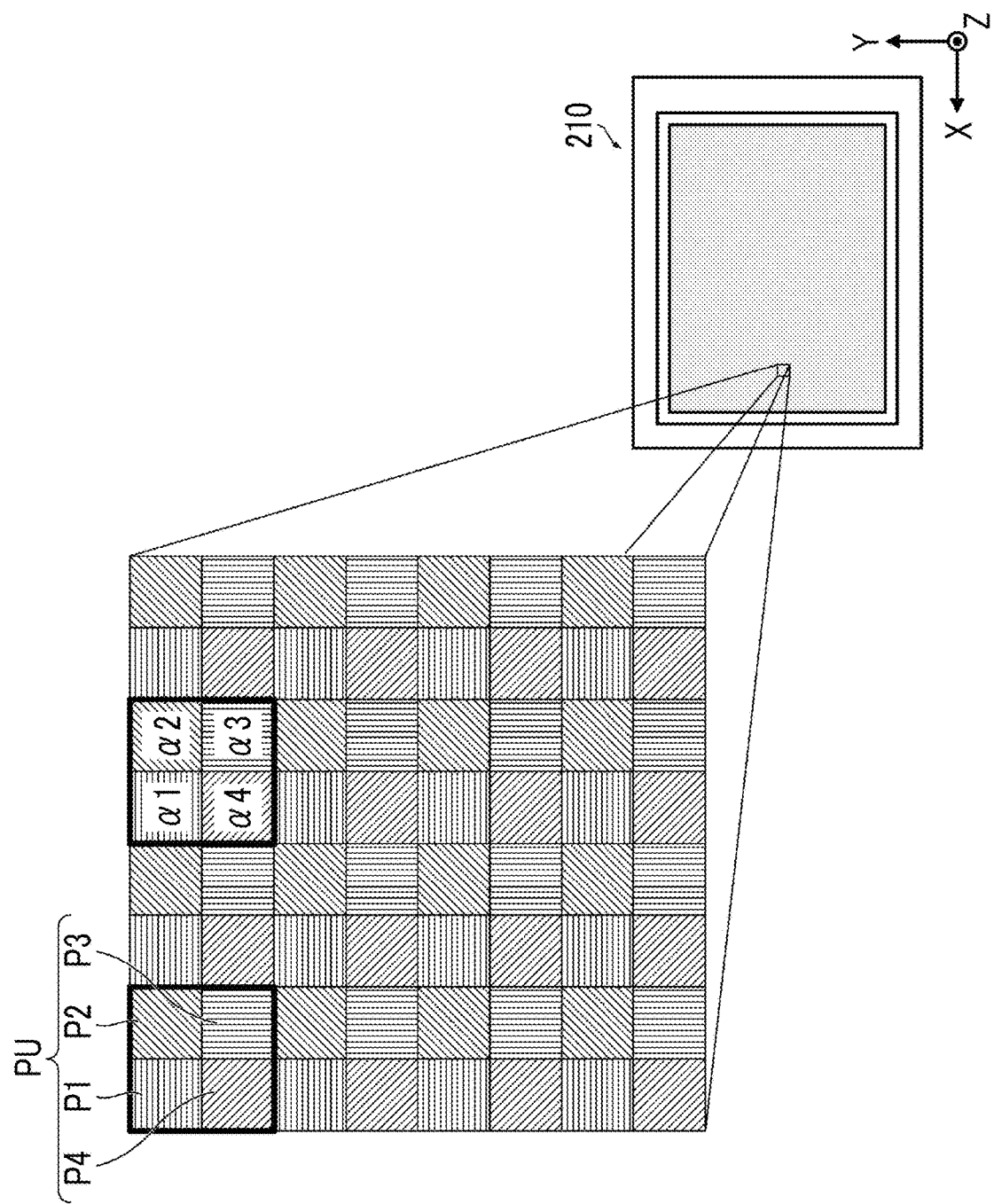
FIG. 8 is a diagram showing an example of arrangement of a pixel and a polarizer in a polarization image sensor.

FIG. 8 is a diagram showing an example of disposition of the pixels and the polarizers in the polarization image sensor.

As shown in the drawing, four polarizers having different angles of the transmission axes are regularly disposed with respect to the pixels disposed in a matrix. A polarizer of which the angle of the transmission axis is $\alpha 1$ is set as a first polarizer, a polarizer of which the angle of the transmission axis is $\alpha 2$ is set as a second polarizer, a polarizer of which the angle of the transmission axis is $\alpha 3$ is set as a third polarizer, and a polarizer of which the angle of the transmission axis is $\alpha 4$ is set as a fourth polarizer. For example, in the present embodiment, the angle $\alpha 1$ of the transmission axis of the first polarizer is set to 0°, the angle $\alpha 2$ of the transmission axis of the second polarizer is set to 45°, the angle $\alpha 3$ of the transmission axis of the third polarizer is set to 90°, and the angle $\alpha 4$ of the transmission axis of the fourth polarizer is set to 135°.

A pixel P1 provided with the first polarizer is set as a first pixel, a pixel P2 provided with the second polarizer is set as a second pixel, a pixel P3 provided with the third polarizer is set as a third pixel, and a pixel P4 provided with the fourth polarizer is set as a fourth pixel. A 2×2 pixel group consisting of the first pixel P1, the second pixel P2, the third pixel P3, and the fourth pixel P4 is set as one unit (pixel unit) PU, and the pixel unit PU is repeatedly disposed along the X-axis and the Y-axis.

In such a polarization image sensor equipped with the polarizers in four directions, it is possible to capture polarized images in four directions in one shot.

The image sensor 210 is composed of, for example, a complementary metal oxide semiconductor (CMOS) type including a driving unit, an analog to digital converter (ADC), a signal processing unit, and the like. In such a case, the image sensor 210 is driven by a built-in driving unit to operate. Further, a signal of each pixel is converted into a digital signal by the built-in ADC and output. Furthermore, the signal of each pixel is output after being subjected to correlation double sampling processing, gain processing, correction processing, and the like by a built-in signal processing unit. The signal processing may be performed after being converted into a digital signal, or may be performed before being converted into the digital signal.

In addition to the image sensor 210, the camera body 200 is provided with an output unit (not shown in the drawing) that outputs data of an image captured by the image sensor 210, a camera control unit (not shown in the drawing) that controls the overall operation of the camera body 200, and the like. The camera control unit is composed of, for example, a processor. The processor functions as the camera control unit by executing a predetermined control program.

In addition, the image data which is output from the camera body 200 is so-called RAW image data. That is, the image data is unprocessed image data. This RAW image data is processed by the signal processing device 300 to generate an image dispersed in a plurality of wavelengths.

[Signal Processing Device]

As described above, the signal processing device 300 processes the image data (RAW image data) which is output from the camera body 200 to generate an image dispersed in a plurality of wavelengths. More specifically, an image having a wavelength corresponding to a transmission wavelength region of the band-pass filter provided in each window portion of the lens device 100 is generated. In the present embodiment, a three-wavelength image is generated which consists of an image of the first wavelength region $\lambda 1$ (first image), an image of the second wavelength region $\lambda 2$ (second image), and an image of the third wavelength region $\lambda 3$ (third image).

Figure 9:
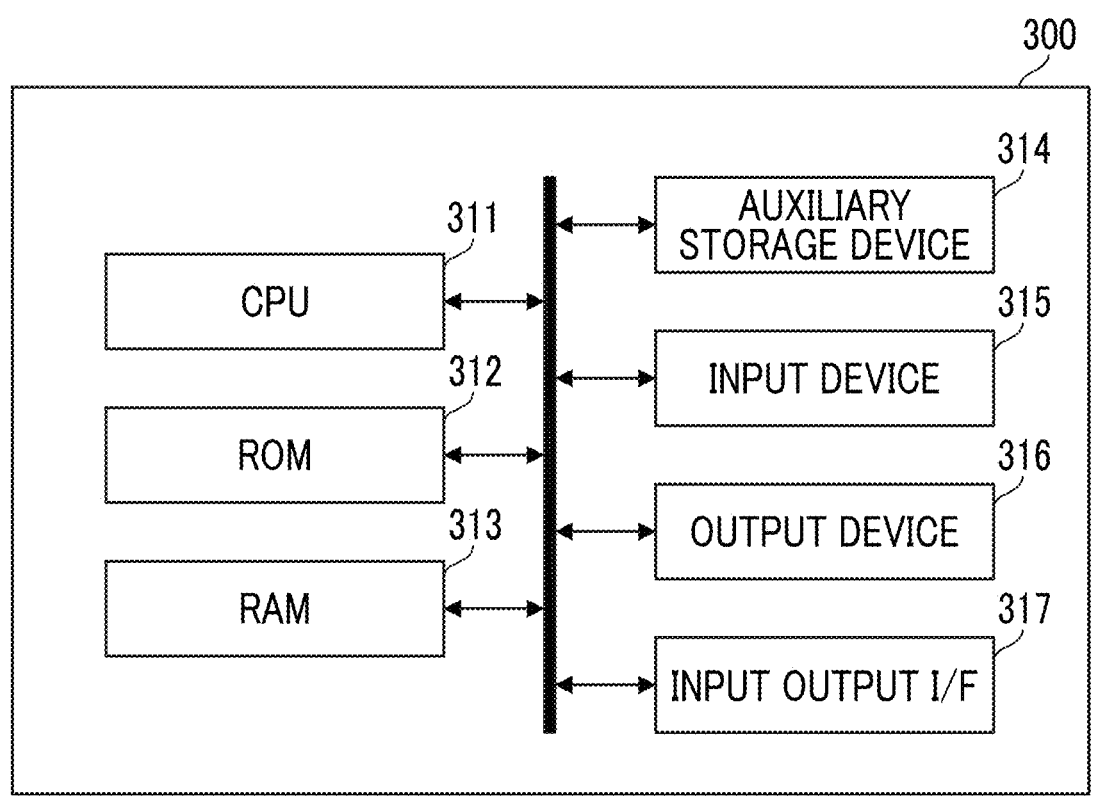
FIG. 9 is a diagram showing an example of a hardware configuration of a signal processing device.

FIG. 9 is a diagram showing an example of a hardware configuration of the signal processing device.

As shown in the drawing, the signal processing device 300 is provided with a central processing unit (CPU) 311, a read only memory (ROM) 312, a random access memory (RAM) 313, an auxiliary storage device 314, an input device 315, an output device 316, an input output interface 317 and the like. Such a signal processing device 300 is composed of, for example, a general-purpose computer such as a personal computer.

In the signal processing device 300, the CPU 311, which is a processor, functions as the signal processing device by executing a predetermined program (signal processing program). The program executed by the CPU 311 is stored in the ROM 312 or the auxiliary storage device 314.

The auxiliary storage device 314 constitutes a storage unit of the signal processing device 300. The auxiliary storage device 314 is composed of, for example, an hard disk drive (HDD), an solid state drive (SSD), or the like.

The input device 315 constitutes an operating part of the signal processing device 300. The input device 315 is composed of, for example, a keyboard, a mouse, a touch panel, or the like.

The output device 316 constitutes a display unit of the signal processing device 300. The output device 316 is composed of, for example, a display such as a liquid crystal display or an organic light emitting diode display.

The input output interface 317 constitutes a connecting part of the signal processing device 300. The signal processing device 300 is connected to the camera body 200 through the input output interface 317.

Figure 10:
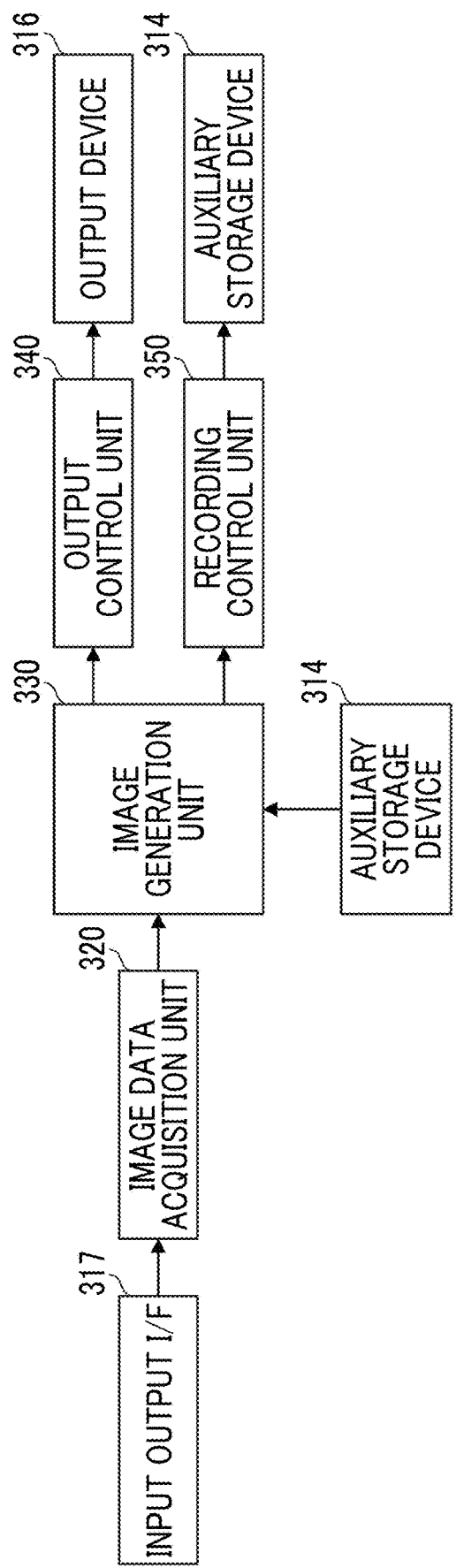
FIG. 10 is a block diagram of a function of the signal processing device.

FIG. 10 is a block diagram of functions of the signal processing device.

As shown in the drawing, the signal processing device 300 has functions of an image data acquisition unit 320, an image generation unit 330, an output control unit 340, and a recording control unit 350. The functions are implemented by the CPU 311 executing a predetermined program.

The image data acquisition unit 320 acquires image data obtained through imaging from the camera body 200. As described above, the image data, which is acquired from the camera body 200, is RAW image data.

The image generation unit 330 generates images having a plurality of wavelengths by performing predetermined signal processing on the image data acquired by the image data acquisition unit 320. In the present embodiment, the image of the first wavelength region λ1 (first image), the image of the second wavelength region λ2 (second image), and the image of the third wavelength region λ3 (third image) are generated. The image generation unit 330 generates images in the respective wavelength regions λ1, λ2, and λ3 by performing processing of removing interference in each pixel unit on the image data acquired by the image data acquisition unit 320. Hereinafter, this processing will be outlined.

As described above, in the polarization image sensor equipped with the polarizers in the four directions, it is possible to capture the polarized images in the four directions in one shot. The polarized images in the four directions include image components of the respective wavelength regions λ1, λ2, and λ3 in a predetermined ratio (interference rate). The interference rate is determined and known by an angle of the transmission axis of the polarized light filter provided in each window portion of the filter unit 120 and an angle of the transmission axis of the polarizer provided in each pixel. Then, by using information of the interference rate, it is possible to generate an image of each wavelength region.

In the images captured by the image sensor 210, it is assumed that a pixel value of the first pixel P1 is x1, a pixel value of the second pixel P2 is x2, a pixel value of the third pixel P3 is x3, and a pixel value of the fourth pixel P4 is x4.

Further, it is assumed that the pixel value of the corresponding pixel of the generated first image is X1, the pixel value of the corresponding pixel of the generated second image is X2, and the pixel value of the corresponding pixel of the generated third image is X3.

Assuming that a ratio of light received in the first wavelength region λ1 by the first pixel P1 is b11, a ratio of light received in the second wavelength region λ2 by the first pixel P1 is b12, a ratio of light received in the third wavelength region λ3 by the first pixel P1 is b13, the following relationship is established between X1, X2, X3, and x1.

$$b11*X1+b12*X2+b13*X3=x1 \quad \text{(Expression 1)}$$

Further, assuming that a ratio of light received in the first wavelength region λ1 by the second pixel P2 is b21, a ratio of light received in the second wavelength region λ2 by the second pixel P2 is b22, and a ratio of light received in the third wavelength region λ3 by the second pixel P2 is b23, the following relationship is established between X1, X2, X3, and x2.

$$b21*X1+b22*X2+b23*X3=x2 \quad \text{(Expression 2)}$$

Further, assuming that a ratio of light received in the first wavelength region λ1 by the third pixel P3 is b31, a ratio of light received in the second wavelength region λ2 by the third pixel P3 is b32, a ratio of light received in the third wavelength region λ3 by the third pixel P3 is b33, the following relationship is established between X1, X2, X3, and x3.

$$b31*X1+b32*X2+b33*X3=x3 \quad \text{(Expression 3)}$$

Further, assuming that a ratio of light received in the first wavelength region λ1 by the fourth pixel P4 is b41, a ratio of light received in the second wavelength region λ2 by the fourth pixel P4 is b42, a ratio of light received in the third wavelength region λ3 by the fourth pixel P4 is b43, the following relationship is established between X1, X2, X3, and x4.

$$b41*X1+b42*X2+b43*X3=x4 \quad \text{(Expression 4)}$$

Regarding X1, X2, and X3, the pixel values X1, X2, and X3 of the corresponding pixels of the first image, the second image, and the third image can be acquired by solving the simultaneous expressions of Expressions 1 to 4.

In such a manner, by using the information of the interference rate, it is possible to generate an image of each wavelength region from the image captured by the image sensor.

Here, the simultaneous expressions described above can be represented by an expression using a matrix. Further, X1, X2, and X3 can be calculated by multiplying both sides by an inverse matrix of the matrix. The signal processing device 300 holds each element of the inverse matrix as a coefficient group. The information of the coefficient group is stored in, for example, the auxiliary storage device 314. The image generation unit 330 acquires information about the coefficient group from the auxiliary storage device 314 and generates an image in each wavelength region.

The output control unit 340 controls outputs of the images (first image, second image, and third image) in the respective wavelength regions generated by the image generation unit 330. In the present embodiment, the output (display) onto the display, which is the output device 316, is controlled.

The recording control unit 350 controls recording of the image in each wavelength region generated by the image generation unit 330 in response to an instruction from the user. The generated images of the respective wavelength regions are recorded in the auxiliary storage device 314.

[Action of Multispectral Camera System]

According to the multispectral camera system 1 of the present embodiment configured as described above, the images spectrally dispersed into three wavelengths can be simultaneously captured. The three wavelengths correspond to the transmission wavelength regions of the three band-pass filters 124A1, 124B1, and 124C1 provided in the lens device 100. Consequently, images in different wavelength regions can be captured by changing the band-pass filter.

Meanwhile, it is preferable to use a reflective type as the band-pass filter due to the high degree of freedom of the spectral transmission characteristics. However, in the case of using the reflection type band-pass filter, there is a concern that a ghost occurs due to the reflection from the band-pass filter.

However, according to the lens device 100 of the present embodiment, since the optical isolators 124A4, 124B4, and 124C4 are provided in the respective window portions 122A, 122B, and 122C, reflection from the band-pass filters 124A1, 124B1, and 124C1 can be suppressed. Thereby, the occurrence of ghost can be effectively suppressed. Further, thereby, it is possible to capture a high-quality image.

MODIFICATION EXAMPLES

[Modification Example of Configuration of Filter Group Provided in Each Window Portion]

As described above, the quarter-wave plate disposed in each window portion of the filter unit is disposed so as to form an optical isolator in combination with the polarized light filter. Specifically, the fast axis is tilted by 45° with respect to the transmission axis of the polarized light filter.

FIG. 11 is a diagram showing a modification example of the filter groups provided in the respective window portions.

In the present example, setting of the quarter-wave plate provided in each window portion is different from that of the filter unit of the above-mentioned embodiment.

As shown in the drawing, as the quarter-wave plate, a quarter-wave plate of which the angle of the fast axis is 135° is disposed in the first window portion. Further, as the quarter-wave plate, a quarter-wave plate of which the angle of the fast axis is 15° is disposed in the second window portion. Furthermore, as the quarter-wave plate, a quarter-wave plate of which the angle of the fast axis is 75° is disposed in the third window portion. That is, in the present example, the quarter-wave plate is disposed at the angle of 45° clockwise with respect to the polarized light filter. Even in such a case, the optical isolator can be configured with the quarter-wave plate and the polarized light filter, similarly to the lens device of the above-mentioned embodiment.

[Modification Example of Optical Isolator]

The optical isolator can also be configured by using a ⅛-wave plate instead of the quarter-wave plate. That is, it is also possible to dispose a ⅛-wave plate instead of the quarter-wave plate, and to form an optical isolator by combining the ⅛-wave plate and the polarized light filter.

Second Embodiment

In the lens device of the first embodiment described above, the optical isolator is disposed on the rear side (image side) of the band-pass filter in each window portion. In the lens device of the present embodiment, the optical isolators are disposed before and after the band-pass filter, that is, on the object side and the image side. The configuration excluding the filter unit is the same as that of the lens device according to the first embodiment. Consequently, in the following description, only the configuration of the filter unit will be described.

Figure 12:
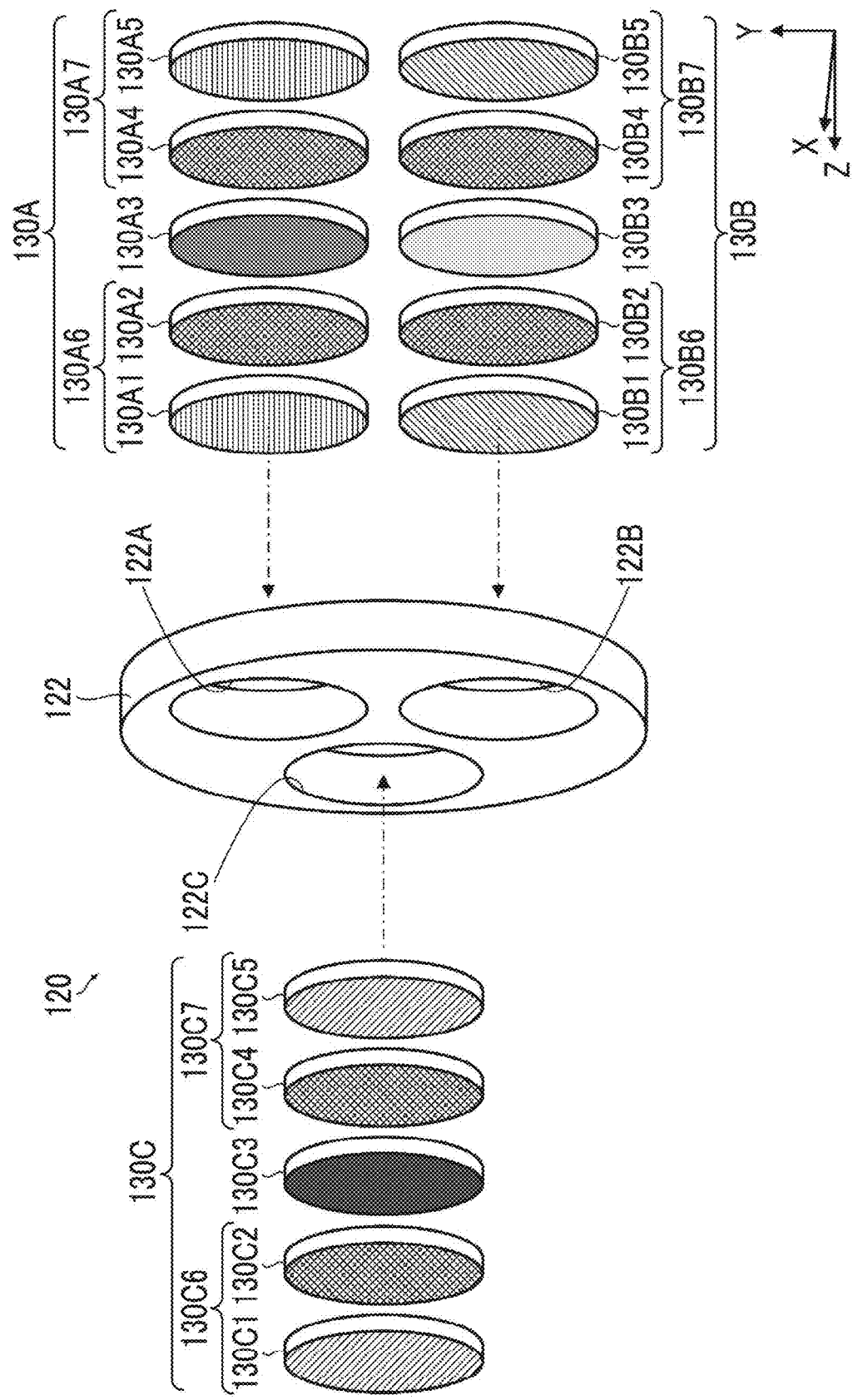
FIG. 12 is a diagram showing a schematic configuration of the filter unit.

FIG. 12 is a diagram showing a schematic configuration of the filter unit.

As shown in the drawing, filter groups 130A, 130B, and 130C are provided for the respective three window portions 122A, 122B, and 122C provided in the filter frame 122. The filter groups 130A, 130B, and 130C each are composed of five filters.

The five filters are composed of first polarized light filters 130A1, 130B1, and 130C1, first quarter-wave plates 130A2, 130B2, and 130C2, band-pass filters 130A3, 130B3, and 130C3, second quarter-wave plates 130A4, 130B4, and 130C4 and second polarized light filters 130A5, 130B5, and 130C5. In the five filters, the first polarized light filters 130A1, 130B1, and 130C1, the first quarter-wave plates 130A2, 130B2, and 130C2, the band-pass filters 130A3, 130B3, and 130C3, the second quarter-wave plates 130A4, 130B4, and 130C4 and the second polarized light filters 130A5, 130B5, and 130C5 are disposed in this order from the object side along the optical axis Z.

In the respective window portions 122A, 122B, and 122C, the first polarized light filters 130A1, 130B1, and 130C1 and the first quarter-wave plates 130A2, 130B2, and 130C2 constitute first optical isolators 130A6, 130B6, and 130C6 on the front side (object side) of the band-pass filters 130A3, 130B3, and 130C3. Further, the second quarter-wave plates 130A4, 130B4, and 130C4, and the second polarized light filters 130A5, 130B5, and 130C5 constitute the second optical isolators 130A7, 130B7, and 130C7 on the rear side (image side) of the band-pass filters 130A3, 130B3, and 130C3.

In order to form the optical isolator, the first quarter-wave plates 130A2, 130B2, and 130C2 are disposed at the angle of 45° with respect to the first polarized light filters 130A1, 130B1, and 130C1. Further, the second quarter-wave plates 130A4, 130B4, and 130C4 are disposed at the angle of 45° with respect to the second polarized light filters 130A5, 130B5, and 130C5.

FIG. 13 is a diagram showing an example of a configuration of the filter groups provided in the respective window portions.

(1) First Window Portion

The first window portion is a window portion that transmits light with the first wavelength region 1.

As shown in FIG. 13, as the first polarized light filter, a polarized light filter of which the angle of the transmission axis is 0° is disposed in the first window portion. Further, as the first quarter-wave plate, a quarter-wave plate of which the angle of the fast axis is 135° is disposed in the first window portion. The first polarized light filter and the first quarter-wave plate constitute the first optical isolator. In the present example, the optical isolator is configured by disposing the first quarter-wave plate at the angle of 45° clockwise with respect to the first polarized light filter.

Further, as the band-pass filter, a band-pass filter having the first wavelength region $\lambda 1$ is disposed in the first window portion.

Further, as the second quarter-wave plate, a quarter-wave plate of which the angle of the fast axis is 45° is disposed in the first window portion. Further, as the second polarized light filter, a polarized light filter of which the angle of the transmission axis is 0° is disposed in the first window portion. A second optical isolator is constituted by the second polarized light filter and the second quarter-wave plate. In the present example, the optical isolator is configured by disposing the second quarter-wave plate at the angle of 45° counterclockwise with respect to the second polarized light filter.

With the above-mentioned settings, the first window portion passes light which is light with the first wavelength region $\lambda 1$ and which is linearly polarized light of which the azimuth angle is 0°. Specifically, first, the light passes through the first polarized light filter to be linearly polarized light of which the azimuth angle is 0°. Next, the light passes through the first quarter-wave plate to be converted into circularly polarized light. Then, the light passes through the band-pass filter to be used as light with the first wavelength region 1. Next, the light passes through the second quarter-wave plate to be returned to linearly polarized light. Finally, the light passes through the second polarized light filter to be linearly polarized light of which the azimuth angle is 0°.

(2) Second Window Portion

The second window portion is a window portion that transmits light with the second wavelength region $\lambda 2$.

As shown in FIG. 13, as the first polarized light filter, a polarized light filter of which the angle of the transmission axis is 60° is disposed in the second window portion. Further, in the second window portion, as the first quarter-wave plate, a quarter-wave plate of which the angle of the fast axis is 15° is disposed. The first polarized light filter and the first quarter-wave plate constitute the first optical isolator. In the present example, the optical isolator is configured by disposing the first quarter-wave plate at the angle of 45° clockwise with respect to the first polarized light filter.

Further, as the band-pass filter, a band-pass filter having a second wavelength region λ2 is disposed in the second window portion.

Further, as the second quarter-wave plate, a quarter-wave plate of which the angle of the fast axis is 105° is disposed in the second window portion. Furthermore, as the second polarized light filter, a polarized light filter of which the angle of the transmission axis is 60° is disposed in the second window portion. A second optical isolator is constituted by the second polarized light filter and the second quarter-wave plate. In the present example, the optical isolator is configured by disposing the second quarter-wave plate at the angle of 45° counterclockwise with respect to the second polarized light filter.

With the above-mentioned settings, the second window portion passes light which is light with the second wavelength region λ2 and which is linearly polarized light of which the azimuth angle is 60°. Specifically, first, the light passes through the first polarized light filter to be linearly polarized light of which the azimuth angle is 60°. Next, the light passes through the first quarter-wave plate to be converted into circularly polarized light. Then, the light passes through the band-pass filter to be used as light with the first wavelength region λ1. Next, the light passes through the second quarter-wave plate to be returned to linearly polarized light. Finally, the light passes through the second polarized light filter to be linearly polarized light of which the azimuth angle is 60°.

(3) Third Window Portion

The third window portion is a window portion that transmits light with the third wavelength region λ3.

As shown in FIG. 13, as the first polarized light filter, a polarized light filter of which the angle of the transmission axis is 120° is disposed in the third window portion. Further, as the first quarter-wave plate, a quarter-wave plate of which the angle of the fast axis is 75° is disposed in the third window portion. The first polarized light filter and the first quarter-wave plate constitute the first optical isolator. In the present example, the optical isolator is configured by disposing the first quarter-wave plate at the angle of 45° clockwise with respect to the first polarized light filter.

Further, as the band-pass filter, a band-pass filter having the third wavelength region λ3 is disposed in the third window portion.

Further, as the second quarter-wave plate, a quarter-wave plate of which the angle of the fast axis is 165° is disposed in the third window portion. Furthermore, as the second polarized light filter, a polarized light filter of which the angle of the transmission axis is 120° is disposed in the third window portion. A second optical isolator is constituted by the second polarized light filter and the second quarter-wave plate. In the present example, the optical isolator is configured by disposing the second quarter-wave plate at the angle of 45° counterclockwise with respect to the second polarized light filter.

With the above-mentioned settings, the third window portion passes light which is light with the third wavelength region λ3 and which is linearly polarized light of which the azimuth angle is 120°. Specifically, first, the light passes through the first polarized light filter to be linearly polarized light of which the azimuth angle is 120°. Next, the light passes through the first quarter-wave plate to be converted into circularly polarized light. Then, the light passes through the band-pass filter to be used as light with the first wavelength region λ1. Next, the light passes through the second quarter-wave plate to be returned to linearly polarized light. Finally, the light passes through the second polarized light filter to be linearly polarized light of which the azimuth angle is 120°.

As described above, the respective window portions provided in the filter unit 120 pass light with the wavelength regions and in the polarization directions different from each other.

FIG. 14 is a diagram showing a function of preventing re-reflection by front and rear optical isolators.

FIG. 14 shows an example in a case where the light reflected by the first lens group 110A (return light) and the light reflected by the second lens group 110B (return light) are incident on the first window portion 122A.

Return light L11 reflected by the first lens group 110A and incident on the first window portion 122A is incident on the band-pass filter 130A3 through the first optical isolator 130A6. In such a case, the first polarized light filter 130A1 and the first quarter-wave plate 130A2 are transmitted through the first optical isolator 130A6 in this order and are incident on the band-pass filter 130A3. In this process, the light is converted into circularly polarized light. In a case where the circularly polarized light is reflected by the band-pass filter 130A3 and is incident on the first quarter-wave plate 130A2 again, the light returns to linearly polarized light rotated by 90°. The light L12 of which the direction is changed is blocked from passing through by the first polarized light filter 130A1. Thereby, the re-reflection due to the return light on the front side (object side) is prevented.

On the other hand, return light L21, which is reflected by the second lens group 110B and is incident on the first window portion 122A, is incident on the band-pass filter 130A3 through the second optical isolator 130A7. In such a case, the second polarized light filter 130A5 and the second quarter-wave plate 130A4 are transmitted through the second optical isolator 130A7 in this order and are incident on the band-pass filter 130A3. In this process, the light is converted into circularly polarized light. In a case where the circularly polarized light is reflected by the band-pass filter 130A3 and is incident on the second quarter-wave plate 130A4 again, the light returns to linearly polarized light rotated by 90°. The light L22 of which the direction is changed is blocked from passing through by the second polarized light filter 130A5. Thereby, the re-reflection due to the return light is prevented.

As described above, according to the lens device of the present embodiment, it is possible to prevent the re-reflection of the return light before and after the band-pass filter. Thereby, ghost can be suppressed more effectively.

MODIFICATION EXAMPLES

[Modification Example of Configuration of Filter Group Provided in Each Window Portion]

As described above, the quarter-wave plate and the polarized light filter disposed before and after the band-pass filter are combined and disposed to form the optical isolator.

Specifically, the quarter-wave plate is disposed at the angle of 45° with respect to the polarized light filter.

First Modification Example

FIGS. 15A to 15C are diagrams showing modification examples of the filter groups provided in the respective window portions.

FIG. 15A shows a first modification example of the filter groups disposed in each window portion.

In the present example, in each window portion, setting of the first quarter-wave plate and the second quarter-wave plate is different from that of the filter unit of the above-mentioned embodiment.

As shown in the drawing, as the first quarter-wave plate, a quarter-wave plate of which the angle of the fast axis is 45° is disposed in the first window portion. Further, as the first quarter-wave plate, a quarter-wave plate of which the angle of the fast axis is 105° is disposed in the second window portion. Furthermore, as the first quarter-wave plate, a quarter-wave plate of which the angle of the fast axis is 165° is disposed in the third window portion. That is, in the present example, the first quarter-wave plate is disposed at the angle of 45° clockwise with respect to the first polarized light filter. Even in such a case, the first optical isolator can be configured with the first quarter-wave plate and the first polarized light filter, similarly to the filter unit of the above-mentioned embodiment.

Further, as shown in the drawing, as the second quarter-wave plate, a quarter-wave plate of which the angle of the fast axis is 135° is disposed in the first window portion. Furthermore, as the second quarter-wave plate, a quarter-wave plate of which the angle of the fast axis is 15° is disposed in the second window portion. Moreover, as the second quarter-wave plate, a quarter-wave plate of which the angle of the fast axis is 75° is disposed in the third window portion. That is, in the present example, the second quarter-wave plate is disposed at the angle of 45° counterclockwise with respect to the second polarized light filter. Even in such a case, the second optical isolator can be configured with the second quarter-wave plate and the second polarized light filter, similarly to the filter unit of the above-mentioned embodiment.

Second Modification Example

FIG. 15B shows a second modification example of the filter groups provided in the respective window portions.

In the present example, a configuration of the first optical isolator of each window portion is different from that of the filter unit of the above-mentioned embodiment.

As shown in the drawing, the first optical isolator of each window portion is composed of the first polarized light filter of which the angle of the transmission axis is 0° and the first quarter-wave plate of which the angle of the fast axis is 135°. That is, in the filter unit of the present example, each window portion is provided with the first optical isolator having the same configuration.

The polarization direction of the light passing through each window portion is finally determined by the second polarized light filter. Consequently, as the first optical isolator, an optical isolator having the same configuration can be used for each window.

Third Modification Example

FIG. 15C shows a third modification example of the filter groups provided in the respective window portions.

In the present example as well, the configuration of the first optical isolator is different from that of the filter unit of the above-mentioned embodiment. Further, also in the present example, each window portion is provided with the first optical isolator having the same configuration. The difference from the second modification example is the setting of the first quarter-wave plate constituting the first optical isolator. As shown in the drawing, as the first quarter-wave plate, a quarter-wave plate of which the angle of the fast axis is 45° is provided. That is, the first quarter-wave plate is disposed with respect to the first polarized light filter at the angle of 45° clockwise.

In addition, although each window portion is provided with the first optical isolator having the same configuration in the present example and the second modification example, the first optical isolator having a different configuration can also be disposed in each window portion.

However, in consideration of the amount of light passing through, it is preferable that the optical isolators (the first optical isolator and the second optical isolator), which are disposed before and after the band-pass filter, are configured as follows. That is, the configuration is made such that the angle of the fast axis of the quarter-wave plate is different before and after the band-pass filter. More preferably, the fast axes of the quarter-wave plate are orthogonal to each other before and after the band-pass filter.

It is difficult to realize a perfect quarter-wave plate at all wavelengths. For this reason, elliptically polarized light is obtained in the process of passing through the first quarter-wave plate and the second quarter-wave plate. In a case where the light passes through the polarized light filter in this state, the amount of light is reduced. This effect is maximized in a case where the fast axes of the first quarter-wave plate and the second quarter-wave plate coincide with each other. That is, the reduction in the amount of light is large.

Therefore, the angle of the fast axis of the quarter-wave plate is different before and after the band-pass filter. More preferably, the fast axes of the quarter-wave plate are orthogonal to each other before and after the band-pass filter.

The configuration of the above-mentioned embodiment and the configuration of the first modification example are configurations in which the fast axes of the quarter-wave plates are orthogonal to each other before and after the band-pass filter in all the window portions.

Third Embodiment

In the lens device according to the first and second embodiments, the polarization direction of the light passing through each window portion is adjusted by the polarized light filter disposed on the rear side of the band-pass filter.

In the present embodiment, the half-wave plate is further disposed on the rear side of the optical isolator disposed on the rear side of the band-pass filter to adjust the polarization direction of the light passing through each window portion.

The configuration excluding the filter unit is the same as that of the lens device according to the first embodiment. Consequently, in the following description, only the configuration of the filter unit will be described.

FIG. 16 is a diagram showing a schematic configuration of the filter unit.

As shown in the drawing, the window portions 122A, 122B, and 122C are provided with filter groups 140A, 140B, and 140C, respectively.

The filter group 140A provided in the first window portion 122A is composed of three filters. On the other hand, the filter group 140B of the second window portion 122B is composed of four filters. Further, the filter group 140C provided in the third window portion 122C is also composed of four filters.

The filter group 140A provided in the first window portion 122A is composed of a band-pass filter 140A1, a quarter-wave plate 140A2, and a polarized light filter 140A3. The filters are disposed along the optical axis Z in the order of the band-pass filter 140A1, the quarter-wave plate 140A2, and the polarized light filter 140A3 from the object side. Further, the optical isolator 140A4 is configured by the quarter-wave plate 140A2 and the polarized light filter 140A3.

The filter group 140B provided in the second window portion 122B is composed of a band-pass filter 140B1, a quarter-wave plate 140B2, a polarized light filter 140B3, and a half-wave plate (HWP) 140B5. The filters are disposed along the optical axis Z in the order of the band-pass filter 140B1, the quarter-wave plate 140B2, the polarized light filter 140B3, and the half-wave plate 140B5 from the object side. Further, the optical isolator 140B4 is configured by the quarter-wave plate 140B2 and the polarized light filter 140B3.

The filter group 140C provided in the third window portion 122C is composed of a band-pass filter 140C1, a quarter-wave plate 140C2, a polarized light filter 140C3, and a half-wave plate 140C5. The filters are disposed along the optical axis Z in the order of the band-pass filter 140C1, the quarter-wave plate 140C2, the polarized light filter 140C3, and the half-wave plate 140C5 from the object side. Further, the optical isolator 140C4 is configured by the quarter-wave plate 140C2 and the polarized light filter 140C3.

FIG. 17 is a diagram showing an example of a configuration of the filter groups provided in the respective window portions.

(1) First Window Portion

As shown in FIG. 17, as the band-pass filter (BPF), the band-pass filter having the first wavelength region $\lambda 1$ is disposed in the first window portion. Further, as the quarter-wave plate (QWP), a quarter-wave plate of which the angle of the fast axis is 45° is disposed in the first window portion. Furthermore, as the polarized light filter (PLF), a polarized light filter of which the angle of the transmission axis is 0° is disposed in the first window portion.

In the first window portion, an optical isolator is composed of the quarter-wave plate and the polarized light filter. In the present example, the optical isolator is configured by disposing the quarter-wave plate at the angle of 45° counterclockwise with respect to the polarized light filter.

With the above-mentioned settings, the first window portion passes light which is light with the first wavelength region $\lambda 1$ and which is linearly polarized light of which the azimuth angle is 0°.

(2) Second Window Portion

As shown in FIG. 17, as the band-pass filter (BPF), the band-pass filter having the second wavelength region $\lambda 2$ is disposed in the second window portion. Further, as the quarter-wave plate (QWP), a quarter-wave plate of which the angle of the fast axis is 45° is disposed in the second window portion. Furthermore, as the polarized light filter (PLF), a polarized light filter of which the angle of the transmission axis is 0° is disposed in the second window portion. Moreover, as the half-wave plate (HWP), a half-wave plate of which the angle of the fast axis is 30° is disposed in the second window portion.

Similarly to the first window portion, in the second window portion, a quarter-wave plate and a polarized light filter form an optical isolator. In the present example, the optical isolator is configured by disposing the quarter-wave plate at the angle of 45° counterclockwise with respect to the polarized light filter. It should be noted that the configuration of the optical isolator is the same as that of the first window portion. Consequently, light in the same polarization direction as that of the first window portion passes through the front of the half-wave plate. In the second window portion, the polarization direction is switched by further passing the light through the half-wave plate. In a case where the half-wave plate is tilted with respect to the polarized light filter by an angle $\Phi$, the existing polarization is rotated by $2\Phi$. In the present example, the fast axis of the half-wave plate is tilted by 30° with respect to the angle (0°) of the transmission axis of the polarized light filter. Accordingly, in the second window portion, the light passes through the half-wave plate to be linearly polarized light of which the azimuth angle is 60° and is emitted from the window portion.

(3) Third Window Portion

As shown in FIG. 17, as the band-pass filter (BPF), a band-pass filter having the third wavelength region $\lambda 3$ is disposed in the third window portion. Further, as the quarter-wave plate (QWP), a quarter-wave plate of which the angle of the fast axis is 45° is disposed in the third window portion. Furthermore, as the polarized light filter (PLF), a polarized light filter of which the angle of the transmission axis is 0° is disposed in the third window portion. Moreover, as the half-wave plate (HWP), a half-wave plate of which the angle of the fast axis is 150° is disposed in the third window portion.

Similarly to the first window portion and the second window portion, in the third window portion, the quarter-wave plate and the polarized light filter form an optical isolator. In the present example, the optical isolator is configured by disposing the quarter-wave plate at the angle of 45° counterclockwise with respect to the polarized light filter. It should be noted that the configuration of the optical isolator is the same as that of the first window portion and the second window portion. Consequently, light in the same polarization direction as that of the first window portion and the second window portion passes through the front of the half-wave plate. Similarly to the second window portion, the third window portion also passes through the half-wave plate to switch the polarization direction. In the third window portion, the fast axis of the half-wave plate is tilted by 150° with respect to the angle (0°) of the transmission axis of the polarized light filter. Accordingly, in the third window portion, the light passes through the half-wave plate to be linearly polarized light of which the azimuth angle is 120° and is emitted from the window portion.

As described above, according to the filter unit of the present embodiment, it is possible to pass light with the wavelength regions and in the polarization directions different from each other from each window portion.

Further, according to the filter unit of the present embodiment, the optical isolator having the same configuration can be used for each window portion.

In the present embodiment, although the optical isolators having the same configuration are used for each window portion, the optical isolators having different configurations may be used for each window portion. That is, it is also possible to use optical isolators in which settings of the angles of the quarter-wave plate and the polarized light filter are different in each window portion.

Further, in the present embodiment, the half-wave plate is disposed in addition to the first window portion, but the half-wave plate may be provided in all the window portions.

MODIFICATION EXAMPLES

[Modification Example of Configuration of Filter Group Provided in Each Window Portion]

FIG. 18 is a diagram showing a modification example of the filter groups provided in the respective window portions.

In the present example, setting of the quarter-wave plate provided in each window portion is different from that of the filter unit of the above-mentioned embodiment.

As shown in FIG. 18, each window portion is provided with a quarter-wave plate of which the angle of the fast axis is 135° as the quarter-wave plate. That is, in the present example, the quarter-wave plate is disposed at the angle of 45° clockwise with respect to the polarized light filter. Even in such a case, the optical isolator can be configured with the quarter-wave plate and the polarized light filter, similarly to the filter unit of the above-mentioned embodiment.

Also in the case of the present example, linearly polarized light, which is light with the first wavelength region λ1 and of which the azimuth angle is 0°, is emitted from the first window portion. Further, linearly polarized light, which is light with the second wavelength region λ2 and of which the azimuth angle is 60°, is emitted from the second window portion. Furthermore, linearly polarized light, which is light with the third wavelength region λ3 and of which the azimuth angle is 120°, is emitted from the third window portion.

[Examples of Configuration of Filter Groups in Case where Optical Isolators are Disposed Before and After Band-Pass Filter]

In a case where the optical isolators are disposed before and after the band-pass filter, the polarization direction of the light passing through each window portion can be adjusted by the same method.

FIGS. 19A and 19B are diagrams each showing an example of a configuration of the filter groups provided in the respective window portions in a case where the optical isolators are disposed before and after the band-pass filter.

In a case where the optical isolators are disposed before and after the band-pass filter, the half-wave plate is disposed on the rear side of the optical isolator (second optical isolator) on the rear side. More specifically, the half-wave plate is disposed on the rear side of the polarized light filter (second polarized light filter) that constitutes the optical isolator on the rear side. In addition, in the example shown in each of FIGS. 19A and 19B, an example in which the half-wave plates are disposed only in the second window portion and the third window portion is shown.

First Configuration Example

FIG. 19A is a diagram showing a first configuration example of the filter groups provided in the respective window portions.

As shown in the drawing, the first optical isolator having the same configuration is disposed in each window portion. Further, the second optical isolator having the same configuration is disposed in each window portion.

In each window portion, the first optical isolator, which is disposed on the front side (object side) of the band-pass filter (BPF), is composed of the first polarized light filter (first PLF) of which the angle of the transmission axis is 0° and the first quarter-wave plate (first QWP) of which the angle of the fast axis is 135°.

Further, in each window portion, the second optical isolator, which is disposed on the rear side (image side) of the band-pass filter (BPF), is composed of the second quarter-wave plate (second QWP) of which the angle of the fast axis is 45° and the second polarized light filter (second PLF) of which the angle of the transmission axis is 0°.

The second window portion and the third window portion are further provided with the half-wave plate (HWP). The half-wave plate is disposed on the rear side of the second optical isolator. A half-wave plate of which the angle of the fast axis is 30° is disposed in the second window portion. A half-wave plate of which the angle of the fast axis is 150° is disposed in the third window portion.

Also in the case of the present example, linearly polarized light, which is light with the first wavelength region λ1 and of which the azimuth angle is 0°, is emitted from the first window portion. Further, linearly polarized light, which is light with the second wavelength region λ2 and of which the azimuth angle is 60°, is emitted from the second window portion. Furthermore, linearly polarized light, which is light with the third wavelength region λ3 and of which the azimuth angle is 120°, is emitted from the third window portion.

Second Configuration Example

FIG. 19B is a diagram showing a second configuration example of the filter groups provided in the respective window portions.

As shown in the drawing, also in the case of the present example, the first optical isolator having the same configuration and the second optical isolator having the same configuration are disposed in each window portion. The difference from the first configuration example is the setting of the angle of the quarter-wave plate constituting the optical isolator.

The first optical isolator is composed of the first polarized light filter (first PLF) of which the angle of the transmission axis is 0° and the first quarter-wave plate (first QWP) of which the angle of the fast axis is 135°.

On the other hand, the second optical isolator is composed of the second quarter-wave plate (second QWP) of which the angle of the fast axis is 45° and the second polarized light filter (second PLF) of which the angle of the transmission axis is 0°.

Also in the case of the present example, linearly polarized light, which is light with the first wavelength region λ1 and of which the azimuth angle is 0°, is emitted from the first window portion. Further, linearly polarized light, which is light with the second wavelength region λ2 and of which the azimuth angle is 60°, is emitted from the second window portion. Furthermore, linearly polarized light, which is light with the third wavelength region λ3 and of which the azimuth angle is 120°, is emitted from the third window portion.

In any of the first and second configuration examples, the fast axes of the quarter-wave plates are orthogonal to each other before and after the band-pass filter. Thereby, it is possible to prevent reduction in amount of light passing through each window portion.

It should be noted that, in the case of the present example as well, the optical isolators having different configurations can be used for each window portion. Further, it is possible to have a configuration in which the half-wave plates are provided in all the window portions.

Fourth Embodiment

By disposing the optical isolator on the front side (object side) of the band-pass filter, re-reflection of the return light from the front can be prevented.

However, in a case where the optical isolator is disposed only on the front side of the band-pass filter, the light converted into circularly polarized light is emitted from each window portion.

Therefore, in a case where the optical isolator is disposed on the front side of the band-pass filter, a polarized light filter is further disposed on the rear side of the band-pass filter to adjust the polarization direction of the light passing through each window portion.

The configuration excluding the filter unit is the same as that of the lens device according to the first embodiment. Consequently, in the following description, only the configuration of the filter unit will be described.

FIG. 20 is a diagram showing a schematic configuration of the filter unit.

As shown in the drawing, the window portions 122A, 122B, and 122C are provided with filter groups 150A, 150B, and 150C, respectively. The filter groups 150A, 150B, and 150C, which are provided for the respective window portions 122A, 122B, and 122C, are composed of four filters. Specifically, the filter groups 150A, 150B, and 150C are composed of first polarized light filters 150A1, 150B1, and 150C1, quarter-wave plates 150A2, 150B2, and 150C2, band-pass filters 150A3, 150B3, and 150C3, and second polarized light filters 150A4, 150B4, and 150C4. The filters are disposed along the optical axis Z in order of, from the object side, the first polarized light filters 150A1, 150B1, and 150C1, the quarter-wave plates 150A2, 150B2, and 150C2, the band-pass filters 150A3, 150B3, and 150C3, and the second polarized light filters 150A4, 150B4, and 150C4. Then, the optical isolators 150A5, 150B5, and 15005 are constituted by the first polarized light filters 150A1, 150B1, and 150C1, and the quarter-wave plates 150A2, 150B2, and 150C2.

FIG. 21 is a diagram showing an example of a configuration of the filter groups provided in the respective window portions.

(1) First Window Portion

As shown in FIG. 21, as the first polarized light filter (first PLF), a polarized light filter of which the angle of the transmission axis is 0° is disposed in the first window portion. Further, as the quarter-wave plate (QWP), a quarter-wave plate of which the angle of the fast axis is 45° is disposed in the first window portion. Furthermore, as the band-pass filter (BPF), a band-pass filter having the first wavelength region λ1 is disposed in the first window portion. Moreover, as the second polarized light filter (second PLF), a polarized light filter of which the angle of the transmission axis is 0° is disposed.

In the first window portion, an optical isolator is constituted by the first polarized light filter and the quarter-wave plate. In the present example, the optical isolator is configured by disposing the quarter-wave plate at the angle of 45° counterclockwise with respect to the polarized light filter.

(2) Second Window Portion

As shown in FIG. 21, as the first polarized light filter (first PLF), a polarized light filter of which the angle of the transmission axis is 0° is disposed in the second window portion. Further, as the quarter-wave plate (QWP), a quarter-wave plate of which the angle of the fast axis is 45° is disposed in the second window portion. Furthermore, as the band-pass filter (BPF), a band-pass filter having a first wavelength region λ1 is disposed in the second window portion. Moreover, as the second polarized light filter (second PLF), a polarized light filter of which the angle of the transmission axis is 60° is disposed.

In the second window portion, an optical isolator is constituted by the first polarized light filter and the quarter-wave plate. In the present example, the optical isolator is configured by disposing the quarter-wave plate at the angle of 45° counterclockwise with respect to the polarized light filter.

(3) Third Window Portion

As shown in FIG. 21, as the first polarized light filter (first PLF), a polarized light filter of which the angle of the transmission axis is 0° is disposed in the third window portion. Further, as the quarter-wave plate (QWP), a quarter-wave plate of which the angle of the fast axis is 45° is disposed in the third window portion. Furthermore, as the band-pass filter (BPF), a band-pass filter having a first wavelength region λ1 is disposed in the third window portion. Moreover, as the second polarized light filter (second PLF), a polarized light filter of which the angle of the transmission axis is 120° is disposed.

In the third window portion, an optical isolator is constituted by the first polarized light filter and the quarter-wave plate. In the present example, the optical isolator is configured by disposing the quarter-wave plate at the angle of 45° counterclockwise with respect to the polarized light filter.

As described above, in the filter unit of the present embodiment, each window portion is provided with the optical isolator having the same configuration, and the polarization direction is adjusted substantially by the second polarized light filter.

According to the filter unit of the present embodiment, linearly polarized light, which is light with the first wavelength region λ1 and of which the azimuth angle is 0°, is emitted from the first window portion. Further, linearly polarized light, which is light with the second wavelength region λ2 and of which the azimuth angle is 60°, is emitted from the second window portion. From the third window portion, light, which is light with the third wavelength region λ3 and which is linearly polarized light of which the azimuth angle is 120°, is emitted.

MODIFICATION EXAMPLES

[Modification Example of Configuration of Filter Group Provided in Each Window Portion]

As described above, in a case where the optical isolator is disposed on the front side of the band-pass filter, the polarized light filter is further disposed on the rear side of the band-pass filter to adjust the polarization direction of the light passing through each window portion.

FIGS. 22A to 22C are diagrams each showing a modification example of the filter groups provided in the respective window portions.

First Modification Example

FIG. 22A shows a first modification example of the filter groups disposed in each window portion.

In the filter unit of the present example, each window portion is provided with the optical isolator having the same configuration. The difference from the filter unit of the above-mentioned embodiment is the setting of the angle of the quarter-wave plate.

As shown in FIG. 22A, as the quarter-wave plate, a quarter-wave plate of which the angle of the fast axis is 135° is disposed in each window portion. That is, in the present example, the quarter-wave plate is disposed at the angle of 45° clockwise with respect to the first polarized light filter. Even in such a case, the optical isolator can be constituted by the quarter-wave plate and the first polarized light filter, similarly to the filter unit of the above-mentioned embodiment.

Second Modification Example

FIG. 22B shows a second modification example of the filter groups disposed in each window portion.

In the filter unit of the present example, each window portion is provided with an optical isolator having a different configuration. The configuration of the second polarized light filter is the same as that of the filter unit of the above-mentioned embodiment.

As shown in FIG. 22B, as the first polarized light filter (first PLF), a polarized light filter of which the angle of the transmission axis is 0° is disposed in the first window portion. Further, as the quarter-wave plate (QWP), a quarter-wave plate of which the angle of the fast axis is 45° is disposed in the first window portion. In the first window portion, the optical isolator is configured by disposing the quarter-wave plate at the angle of 45° in a counterclockwise direction with respect to the first polarized light filter.

As the first polarized light filter (first PLF), a polarized light filter of which the angle of the transmission axis is 60° is disposed in the second window portion. Further, as the quarter-wave plate (QWP), a quarter-wave plate of which the angle of the fast axis is 15° is disposed in the second window portion. Also in the second window portion, an optical isolator is configured by disposing the quarter-wave plate at the angle of 45° counterclockwise with respect to the first polarized light filter.

As the first polarized light filter (first PLF), a polarized light filter of which the angle of the transmission axis is 120° is disposed in the third window portion. Further, as the quarter-wave plate (QWP), a quarter-wave plate of which the angle of the fast axis is 75° is disposed in the third window portion. Also in the third window portion, the optical isolator is configured by disposing the quarter-wave plate at the angle of 45° counterclockwise with respect to the first polarized light filter.

Third Modification Example

FIG. 22C shows a third modification example of the filter groups disposed in each window portion.

In the filter unit of the present example as well, each window portion is provided with an optical isolator having a different configuration. The difference from the second modification example is the setting of the angle of the quarter-wave plate.

As shown in FIG. 22C, as the first polarized light filter (first PLF), a polarized light filter of which the angle of the transmission axis is 0° is disposed in the first window portion. Further, as the quarter-wave plate (QWP), a quarter-wave plate of which the angle of the fast axis is 135° is disposed in the first window portion. In the first window portion, the optical isolator is configured by disposing the quarter-wave plate at the angle of 45° clockwise with respect to the first polarized light filter.

As the first polarized light filter (first PLF), a polarized light filter of which the angle of the transmission axis is 60° is disposed in the second window portion. Further, as the quarter-wave plate (QWP), a quarter-wave plate of which the angle of the fast axis is 105° is disposed in the second window portion. Also in the second window portion, an optical isolator is configured by disposing the quarter-wave plate at the angle of 45° clockwise with respect to the first polarized light filter.

As the first polarized light filter (first PLF), a polarized light filter of which the angle of the transmission axis is 120° is disposed in the third window portion. Further, as the quarter-wave plate (QWP), a quarter-wave plate of which the angle of the fast axis is 165° is disposed in the third window portion. Also in the third window portion, the optical isolator is configured by disposing the quarter-wave plate at the angle of 45° clockwise with respect to the first polarized light filter.

OTHER EMBODIMENTS AND MODIFICATION EXAMPLES

[Number of Window Portions]

The window portions are set in the filter unit in accordance with the number of wavelengths to be dispersed. For example, in a case of performing imaging by splitting into two wavelengths, at least two window portions are provided. Further, in a case of performing imaging by splitting into four wavelengths, at least four window portions are provided.

FIG. 23 is a diagram showing an example of a configuration of the filter unit in a case where imaging is performed by splitting the spectrum into four wavelengths. It should be noted that FIG. 23 shows an example in which optical isolators are disposed before and after the band-pass filter.

As shown in the drawing, the filter frame 122 is provided with the four window portions 122A, 122B, 122C, and 122D. The window portions 122A to 122D are disposed on the same circumference about the center of the filter frame 122 at regular intervals. That is, the window portions 122A to 122D are disposed at 90° intervals. Hereinafter, the window portions 122A to 122D will be respectively distinguished, as necessary, such that the window portion 122A is set as the first window portion, the window portion 122B is set as the second window portion, the window portion 122C is set as the third window portion, and the window portion 122D is set as the fourth window portion.

Filter groups 160A to 160D are provided for the respective window portions 122A to 122D. Each of the filter groups 160A to 160D is composed of five filters.

The five filters are composed of first polarized light filters 160A1 to 160D1, first quarter-wave plates 160A2 to 160D2, band-pass filters 160A3 to 160D3, and second quarter-wave plates 160A4 to 160D4, and second polarized light filters 160A5 to 160D5. The five filters are disposed along the optical axis Z in order of, from the object side, the first polarized light filters 160A1 to 160D1, the first quarter-wave plates 160A2 to 160D2, the band-pass filters 160A3 to 160D3, the second quarter-wave plates 160A4 to 160D4, and the second polarized light filters 160A5 to 160D5.

In the respective window portions 122A to 122D, the first polarized light filters 160A1 to 160D1 and the first quarter-wave plates 160A2 to 160D2 constitute first optical isolators 160A6 to 160D6 on the front side (object side) of the band-pass filters 160A3 to 160D3. Further, the second quarter-wave plates 160A4 to 160D4 and the second polarized light filters 160A5 to 160D5 constitute second optical isolators 160A7 to 160D7 on the rear side (image side) of the band-pass filters 160A3 to 160D3.

In order to form the optical isolator, the first quarter-wave plates 160A2 to 160D2 are disposed at the angle of 45° with respect to the first polarized light filters 160A1 to 160D1. Further, the second quarter-wave plates 160A4 to 160D4 are disposed at the angle of 45° with respect to the second polarized light filters 160A5 to 160D5.

FIG. 24 is a diagram showing an example of a configuration of the filter groups provided in the respective window portions.

(1) First Window Portion

The first window portion is a window portion that transmits light with the first wavelength region $\lambda 1$.

As shown in FIG. 24, as the first polarized light filter, a polarized light filter of which the angle of the transmission axis is 0° is disposed in the first window portion. Further, as the first quarter-wave plate, a quarter-wave plate of which the angle of the fast axis is 45° is disposed in the first window portion. The first polarized light filter and the first quarter-wave plate constitute the first optical isolator. In the present example, the optical isolator is configured by disposing the first quarter-wave plate at the angle of 45° counterclockwise with respect to the first polarized light filter.

Further, as the band-pass filter, a band-pass filter having the first wavelength region $\lambda 1$ is disposed in the first window portion.

Further, in the first window portion, as the second quarter-wave plate, a quarter-wave plate of which the angle of the fast axis is 135° is disposed. Further, as the second polarized light filter, a polarized light filter of which the angle of the transmission axis is 0° is disposed in the first window portion. A second optical isolator is constituted by the second polarized light filter and the second quarter-wave plate. In the present example, the optical isolator is configured by disposing the second quarter-wave plate at the angle of 45° clockwise with respect to the second polarized light filter.

With the above-mentioned settings, the first window portion passes light which is light with the first wavelength region $\lambda 1$ and which is linearly polarized light of which the azimuth angle is 0°.

(2) Second Window Portion

The second window portion is a window portion that transmits light with the second wavelength region $\lambda 2$.

As shown in FIG. 24, as the first polarized light filter, a polarized light filter of which the angle of the transmission axis is 0° is disposed in the second window portion. Further, as the first quarter-wave plate, a quarter-wave plate of which the angle of the fast axis is 45° is disposed in the second window portion. That is, the second window portion is provided with the polarized light filter and the quarter-wave plate having the same configuration as the first window portion on the front side of the band-pass filter.

Further, as the band-pass filter, a band-pass filter having the second wavelength region $\lambda 2$ is disposed in the second window portion.

Furthermore, as the second quarter-wave plate, a quarter-wave plate of which the angle of the fast axis is 15° is disposed in the second window portion. Furthermore, as the second polarized light filter, a polarized light filter of which the angle of the transmission axis is 60° is disposed in the second window portion. A second optical isolator is constituted by the second polarized light filter and the second quarter-wave plate. In the present example, the optical isolator is configured by disposing the second quarter-wave plate at the angle of 45° clockwise with respect to the second polarized light filter.

With the above-mentioned settings, the second window portion passes light which is light with the second wavelength region $\lambda 2$ and which is linearly polarized light of which the azimuth angle is 60°.

(3) Third Window Portion

The third window portion is a window portion that transmits light with the third wavelength region $\lambda 3$.

As shown in FIG. 24, as the first polarized light filter, a polarized light filter of which the angle of the transmission axis is 0° is disposed in the third window portion. Further, as the first quarter-wave plate, a quarter-wave plate of which the angle of the fast axis is 45° is disposed in the third window portion. That is, the second window portion is provided with the polarized light filter and the quarter-wave plate having the same configuration as the first window portion on the front side of the band-pass filter.

Further, as the band-pass filter, a band-pass filter having the third wavelength region $\lambda 3$ is disposed in the third window portion.

Moreover, as the second quarter-wave plate, a quarter-wave plate of which the angle of the fast axis is 75° is disposed in the third window portion. Furthermore, as the second polarized light filter, a polarized light filter of which the angle of the transmission axis is 120° is disposed in the third window portion. A second optical isolator is constituted by the second polarized light filter and the second quarter-wave plate. In the present example, the optical isolator is configured by disposing the second quarter-wave plate at the angle of 45° clockwise with respect to the second polarized light filter.

With the above-mentioned settings, the third window portion passes light which is light with the second wavelength region $\lambda 2$ and which is linearly polarized light of which the azimuth angle is 120°.

(4) Fourth Window Portion

The fourth window portion is a window portion that transmits light with the fourth wavelength region $\lambda 4$.

As shown in FIG. 24, as the first polarized light filter, a polarized light filter of which the angle of the transmission axis is 0° is disposed in the fourth window portion. Further, as the first quarter-wave plate, a quarter-wave plate of which the angle of the fast axis is 45° is disposed in the fourth window portion. That is, the second window portion is provided with the polarized light filter and the quarter-wave plate having the same configuration as the first window portion on the front side of the band-pass filter.

Further, as the band-pass filter, a band-pass filter having the fourth wavelength region $\lambda 4$ is disposed in the fourth window portion.

Further, as the second quarter-wave plate, a quarter-wave plate of which the angle of the fast axis is 45° is disposed in the fourth window portion. Further, as the second polarized light filter, a polarized light filter of which the angle of the transmission axis is 90° is disposed in the fourth window portion. A second optical isolator is constituted by the second polarized light filter and the second quarter-wave plate. In the present example, the optical isolator is configured by disposing the second quarter-wave plate at the angle of 45° counterclockwise with respect to the second polarized light filter.

With the above-mentioned settings, the fourth window portion passes light which is light with the fourth wavelength region $\lambda 4$ and which is linearly polarized light of which the azimuth angle is 120°.

As described above, the four window portions 122A to 122D provided in the filter unit 120 pass light with the wavelength regions and in the polarization directions different from each other.

[Shape of Window Portion]

In the above-mentioned embodiment, the shape of the window portion (opening portion shape) is a circular shape, but the shape of the window portion is not limited to this.

Figure 25:
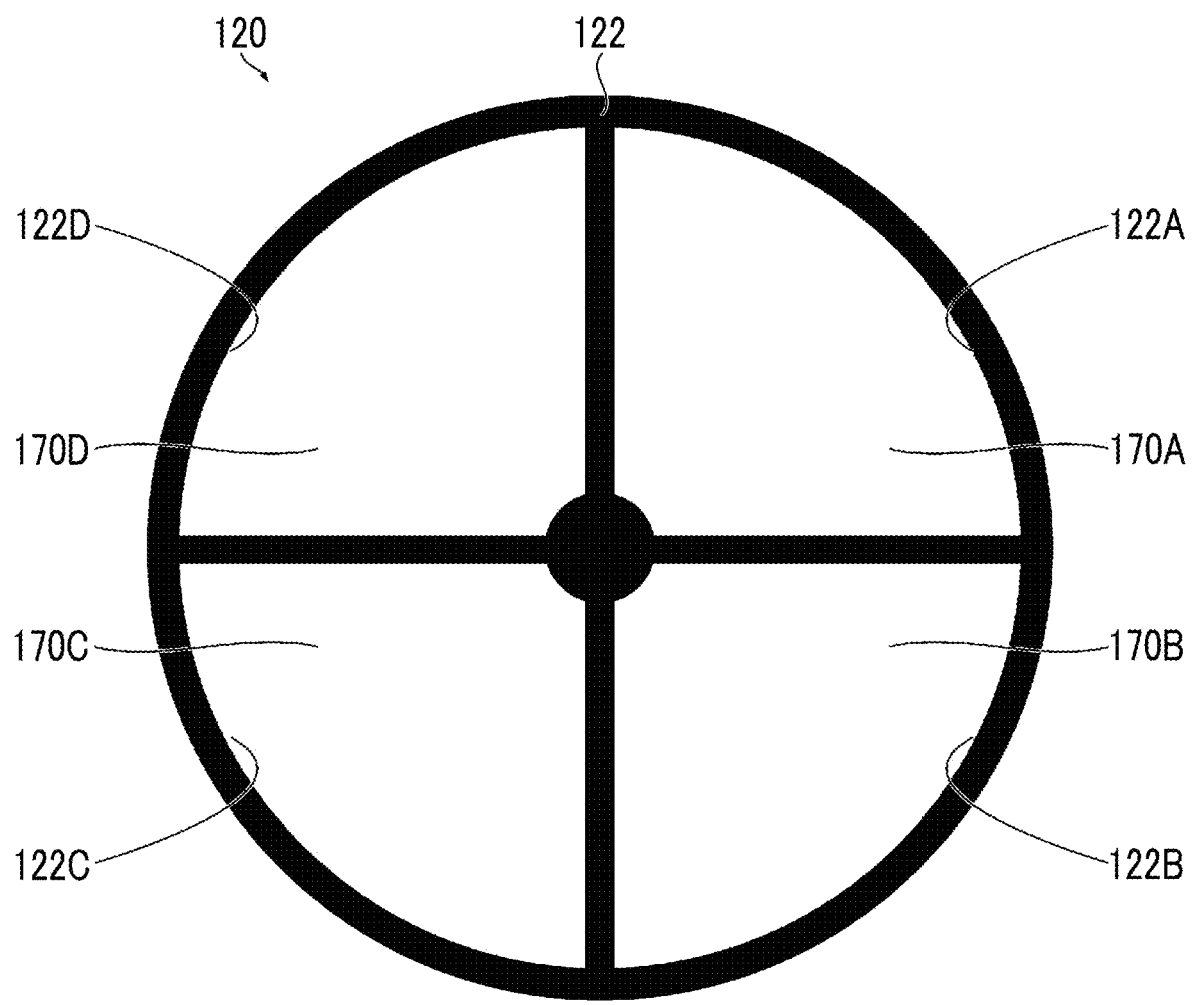
FIG. 25 is a diagram showing another example of a shape of the window portion provided in a filter frame.

FIG. 25 is a diagram showing another example of the shape of the window portion provided in the filter frame.

FIG. 25 shows an example in a case where the four window portions 122A to 122D are provided. In the present example, the disk-shaped filter frame 122 is divided into four equal parts in the circumferential direction to provide the window portions 122A to 122D each having a fan-like opening portion shape. The respective window portions 122A to 122D are provided with fan-shaped filter groups 170A to 170D.

[Modification Example of Lens Device, Filter Unit, and Filter Group]

It is preferable that the lens device has a configuration in which the filter unit can be attached to and detached from the lens barrel. Thereby, the filter unit is interchangeable. Further, it is preferable that the filter unit also has a configuration in which the filter group attached to each window portion is interchangeable. Accordingly, it is possible to freely switch the number and combination of wavelengths to be dispersed.

It should be noted that, in the filter unit having a configuration in which the filter groups are interchangeable, it is not always necessary to use all the window portions. For example, the filter frame may include the four window portions. Then, in a case of capturing an image dispersed in three wavelengths, one window portion is used with light blocking. Accordingly, it is possible to capture an image dispersed in three wavelengths.

Further, the filter group to be attached to each window portion may be configured by integrating (cementing) filters having respective functions, or may be configured by separating the filters having respective functions. In the case of integration, a configuration can be adopted in which an air layer is not included between the filters. Each filter can be cemented and integrated by, for example, optical contacts. Furthermore, in a case where the configurations are separated, filters to be used can be arbitrarily combined.

In a case where the filters having the respective functions are separated, it is preferable that the filter unit has a configuration in which the respective filters can be individually mounted on the respective window portions. Thereby, the filters to be attached to the respective window portions can be optionally combined.

[Image Sensor]

A color polarization image sensor can also be used as the image sensor. For example, in a case of capturing an image dispersed in four wavelengths, the color polarization image sensor is used. The color polarization image sensor is a polarization image sensor provided with color filters for the respective pixels. The color filter is disposed at a predetermined position in each pixel unit. For example, as shown in FIG. 8, in a case where one pixel unit PU is composed of four pixels P1 to P4, a first color filter (for example, a color filter that transmits light with a green wavelength region) is disposed in the first pixel P1, a second color filter (for example, a color filter that transmits light with a red wavelength region) is disposed in the second pixel P2, a third color filter (for example, a color filter that transmits light with a blue wavelength region) is disposed in the third pixel P3, and a fourth color filter (for example, a color filter that transmits light with an infrared region) is disposed in the fourth pixel P4. In each pixel, the color filter is disposed, for example, between the microlens and the polarizer.

In a case where the color polarization image sensor is used, an interference rate is obtained by further adding the information of the spectral transmittance of the color filter provided for each pixel.

[Signal Processing Device]

In the multispectral camera system of the above-mentioned embodiment, the camera body and the signal processing device are separately configured, but the camera body may be provided with the functions of the signal processing device. Further, in such a case, the camera body may be configured to include only the signal processing functions.

Further, various functions included in the signal processing device are implemented by various processors. The various processors include: a CPU and/or a graphic processing unit (GPU) as a general-purpose processor which functions as various processing units by executing programs; a programmable logic device (PLD) as a processor capable of changing a circuit configuration after manufacturing a field programmable gate array (FPGA); a dedicated electrical circuit as a processor, which has a circuit configuration specifically designed to execute specific processing, such as an application specific integrated circuit (ASIC); and the like. Program is synonymous with software.

One processing unit may be composed of one of these various processors, or may be composed of two or more processors of the same type or different types. For example, one processing unit may be composed of a plurality of FPGAs or a combination of a CPU and an FPGA. Further, the plurality of processing units may be composed of one processor. As an example of the plurality of processing units composed of one processor, first, as represented by computers used for a client, a server, and the like, there is a form in which one processor is composed of a combination of one or more CPUs and software and this processor functions as a plurality of processing units. Second, as represented by a system on chip (SoC), there is a form in which a processor that realizes the functions of the whole system including a plurality of processing units with a single integrated circuit (IC) chip is used. As described above, the various processing units are configured by using one or more of the various processors as a hardware structure.

EXPLANATION OF REFERENCES

1: multispectral camera system
10: multispectral camera
100: lens device
110A: lens group (first lens group)
110B: lens group (second lens group)
120: filter unit
122: filter frame
122A: window portion (first window portion)
122B: window portion (second window portion)
122C: window portion (third window portion)
122D: window portion (fourth window portion)
124A: filter group provided in first window portion
124A1: band-pass filter
124A2: quarter-wave plate
124A3: polarized light filter
124A4: optical isolator
124B: filter group provided in second window portion
124B1: band-pass filter
124B2: quarter-wave plate
124B3: polarized light filter
124B4: optical isolator
124C: filter group provided in third window portion 124C1: band-pass filter
124C2: quarter-wave plate
124C3: polarized light filter
124C4: optical isolator
130A: filter group provided in first window portion
130A1: first polarized light filter
130A2: first quarter-wave plate
130A3: band-pass filter
130A4: second quarter-wave plate
130A5: second polarized light filter
130A6: first optical isolator
130A7: second optical isolator
130B: filter group provided in second window portion
130B1: first polarized light filter
130B2: first quarter-wave plate
130B3: band-pass filter
130B4: second quarter-wave plate
130B5: second polarized light filter
130B6: first optical isolator
130B7: second optical isolator
130C: filter group provided in third window portion
130C1: first polarized light filter
130C2: first quarter-wave plate
130C3: band-pass filter
130C4: second quarter-wave plate
130C5: second polarized light filter
130C6: first optical isolator
130C7: second optical isolator
140A: filter group provided in first window portion
140A1: band-pass filter
140A2: quarter-wave plate
140A3: polarized light filter
140A4: optical isolator
140B: filter group provided in second window portion
140B1: band-pass filter
140B2: quarter-wave plate
140B3: polarized light filter
140B4: optical isolator
140B5: half-wave plate
140C: filter group provided in third window portion
140C1: band-pass filter
140C2: quarter-wave plate
140C3: polarized light filter
140C4: optical isolator
140C5: half-wave plate
150A: filter group provided in first window portion
150A1: first polarized light filter
150A2: quarter-wave plate
150A3: band-pass filter
150A4: second polarized light filter
150A5: optical isolator
150B: filter group provided in second window portion
150B1: first polarized light filter
150B2: quarter-wave plate
150B3: band-pass filter
150B4: second polarized light filter
150B5: optical isolator
150C: filter group provided in third window portion
150C1: first polarized light filter
150C2: quarter-wave plate
150C3: band-pass filter
150C4: second polarized light filter
15005: optical isolator
160A: filter group provided in first window portion
160A1: first polarized light filter
160A2: first quarter-wave plate
160A3: band-pass filter
160A4: second quarter-wave plate
160A5: second polarized light filter
160A6: first optical isolator
160A7: second optical isolator
160B: filter group provided in second window portion
160B1: first polarized light filter
160B2: first quarter-wave plate
160B3: band-pass filter
160B4: second quarter-wave plate
160B5: second polarized light filter
160B6: first optical isolator
160B7: second optical isolator
160C: filter group provided in third window portion
160C1: first polarized light filter
160C2: first quarter-wave plate
160C3: band-pass filter
160C4: second quarter-wave plate
160C5: second polarized light filter
160C6: first optical isolator
160C7: second optical isolator
160D: filter group provided in fourth window portion
160D1: first polarized light filter
160D2: first quarter-wave plate
160D3: band-pass filter
160D4: second quarter-wave plate
160D5: second polarized light filter
160D6: first optical isolator
160D7: second optical isolator
170A: filter group provided in first window portion
170B: filter group provided in second window portion
170C: filter group provided in third window portion
170D: filter group provided in fourth window portion
200: camera body
210: image sensor (polarization image sensor)
300: signal processing device
311: CPU
312: ROM
313: RAM
314: auxiliary storage device
315: input device
316: output device
317: input output interface
320: image data acquisition unit
330: image generation unit
340: output control unit
350: recording control unit
FAA: arrow indicating direction of fast axis of quarter-wave plate
FAB: arrow indicating direction of fast axis of quarter-wave plate
FAC: arrow indicating direction of fast axis of quarter-wave plate
L1: return light
L2: light reflected by band-pass filter
L11: return light
L12: light reflected by band-pass filter
L21: return light
L22: light reflected by band-pass filter
LAA: arrow indicating direction of slow axis of quarter-wave plate
LAB: arrow indicating direction of slow axis of quarter-wave plate
LAC: arrow indicating direction of slow axis of quarter-wave plate
LPA: arrow indicating direction of transmission axis of polarized light filter LPB: arrow indicating direction of transmission axis of polarized light filter
LPC: arrow indicating direction of transmission axis of polarized light filter
P1: pixel (first pixel)
P2: pixel (second pixel)
P3: pixel (third pixel)
P4: pixel (fourth pixel)
PU: pixel unit
Z: optical axis
α1: angle of transmission axis of first polarizer
α2: angle of transmission axis of second polarizer
α3: angle of transmission axis of third polarizer
α4: angle of transmission axis of fourth polarizer
θA: angle of transmission axis of polarized light filter provided in first window portion (first angle)
θB: angle of transmission axis of polarized light filter provided in second window portion (second angle)
θC: angle of transmission axis of polarized light filter provided in third window portion (third angle)

What is claimed is:

1. A lens device comprising a filter unit in an optical path,
wherein the filter unit has a plurality of opening portions including a first opening portion and a second opening portion,
at least the first opening portion and the second opening portion each include a band-pass filter, and each include an optical element on at least one of an object side or an image side of the band-pass filter,
the optical element is composed of a polarized light filter and a quarter-wave plate which is tilted by 45° with respect to a transmission axis of the polarized light filter, and
the first opening portion and the second opening portion pass light in different wavelength regions and different polarization directions.

2. The lens device according to claim 1,
wherein the filter unit is disposed at a pupil position or near the pupil position.

3. The lens device according to claim 1,
wherein in a case where the optical element is disposed on the object side and the image side of the band-pass filter,
angles of fast axes of the wave plate are different between the object side and the image side of the band-pass filter.

4. The lens device according to claim 3,
wherein the fast axes of the wave plate are orthogonal to each other on the object side and the image side of the band-pass filter.

5. The lens device according to claim 1,
wherein in a case where the optical element is disposed on the object side of the band-pass filter,
the first opening portion and the second opening portion each further include a polarized light filter on the image side of the band-pass filter.

6. The lens device according to claim 1,
wherein the polarized light filter is an absorption type.

7. An imaging apparatus comprising:
the lens device according to claim 1; and
a polarization image sensor that receives light which passes through the lens device.

8. A lens device comprising a filter unit in an optical path,
wherein the filter unit has a plurality of opening portions including a first opening portion and a second opening portion,
at least the first opening portion and the second opening portion each include a band-pass filter, and each include an optical element on at least one of an object side or an image side of the band-pass filter,
the optical element is composed of a polarized light filter and a wave plate which converts linearly polarized light into circularly polarized light or elliptically polarized light,
the first opening portion and the second opening portion pass light in different wavelength regions and different polarization directions, and
at least one of the first opening portion and the second opening portion further includes a half-wave plate on an image side of the optical element disposed on the image side of the band-pass filter.

9. The lens device according to claim 8,
wherein the wave plate is a quarter-wave plate.

10. The lens device according to claim 8,
wherein the filter unit is disposed at a pupil position or near the pupil position.

11. The lens device according to claim 8,
wherein an angle of a transmission axis of the polarized light filter of the optical element disposed on the image side of the band-pass filter is equal between the first opening portion and the second opening portion.

12. The lens device according to claim 8,
wherein in a case where the optical element is disposed on the object side and the image side of the band-pass filter,
angles of fast axes of the wave plate are different between the object side and the image side of the band-pass filter.

13. The lens device according to claim 8,
wherein in a case where the optical element is disposed on the object side of the band-pass filter,
the first opening portion and the second opening portion each further include a polarized light filter on the image side of the band-pass filter.

14. The lens device according to claim 8,
wherein the polarized light filter is an absorption type.

15. A filter unit that is disposed in an optical path of a lens device, the filter unit comprising:
a plurality of opening portions including a first opening portion and a second opening portion,
wherein at least the first opening portion and the second opening portion each include a band-pass filter, and each include an optical element on at least one of an object side or an image side of the band-pass filter,
the optical element is composed of a polarized light filter and a quarter-wave plate which is tilted by 45° with respect to a transmission axis of the polarized light filter, and
the first opening portion and the second opening portion pass light in different wavelength regions and different polarization directions.

16. An imaging apparatus comprising:
the lens device according to claim 8; and
a polarization image sensor that receives light which passes through the lens device.

* * * * *